(12) United States Patent
Hara

(10) Patent No.: US 12,580,279 B2
(45) Date of Patent: Mar. 17, 2026

(54) SECONDARY BATTERY, ELECTRONIC EQUIPMENT, AND ELECTRIC TOOL

(71) Applicant: MURATA MANUFACTURING CO., LTD., Kyoto (JP)

(72) Inventor: Yasuaki Hara, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 523 days.

(21) Appl. No.: 18/216,158

(22) Filed: Jun. 29, 2023

(65) Prior Publication Data

US 2023/0344093 A1 Oct. 26, 2023

Related U.S. Application Data

(63) Continuation of application No. PCT/JP2022/002023, filed on Jan. 20, 2022.

(30) Foreign Application Priority Data

Feb. 2, 2021 (JP) ................................. 2021-014833

(51) Int. Cl.
*H01M 50/536* (2021.01)
*H01M 10/04* (2006.01)
*H01M 10/0587* (2010.01)

(52) U.S. Cl.
CPC ..... *H01M 50/536* (2021.01); *H01M 10/0431* (2013.01); *H01M 10/0587* (2013.01); *H01M 2220/30* (2013.01)

(58) Field of Classification Search
None
See application file for complete search history.

(56) References Cited

U.S. PATENT DOCUMENTS

2010/0310927 A1 12/2010 Imai et al.
2024/0387856 A1* 11/2024 Kato ................... H01M 50/533

FOREIGN PATENT DOCUMENTS

JP 2007227292 A 9/2007
JP 2007335156 A 12/2007
(Continued)

OTHER PUBLICATIONS

English language machine translation of JP 2007-227292 A. (Year: 2026).*

(Continued)

*Primary Examiner* — Eli S Mekhlin
(74) *Attorney, Agent, or Firm* — K&L Gates LLP

(57) ABSTRACT

A secondary battery improves current collection efficiency. A positive electrode current collector plate and a negative electrode current collector plate each include weld groups that are provided radially. A positive electrode active material uncovered part includes a first weld that is nearest to a winding termination end of a positive electrode foil, and a second weld that is second nearest to the winding termination end of the positive electrode foil after the first weld. A negative electrode active material uncovered part includes a third weld that is nearest to a winding termination end of a negative electrode foil, and a fourth weld that is second nearest to the winding termination end of the negative electrode foil after the third weld. The secondary battery satisfies Expressions (1) and (2) below:

$$0 \leq LC1 \leq LC2 \tag{1}$$

$$0 \leq LA1 \leq LA2 \tag{2}$$

where LC1 represents a distance from the winding termination end of the positive electrode foil to the first weld in millimeters, LC2 represents a distance from the first weld to the second weld in millimeters, LA1 represents a distance (Continued)

from the winding termination end of the negative electrode foil to the third weld in millimeters, and LA2 represents a distance from the third weld to the fourth weld in millimeters.

7 Claims, 20 Drawing Sheets

(56)                    References Cited

FOREIGN PATENT DOCUMENTS

| | | | |
|---|---|---|---|
| JP | 2009277643 | A | 11/2009 |
| WO | 2014068870 | A1 | 5/2014 |

OTHER PUBLICATIONS

International Search Report of corresponding PCT application PCT/JP2022/002023, dated Mar. 22, 2022.

* cited by examiner

SECONDARY BATTERY, ELECTRONIC EQUIPMENT, AND ELECTRIC TOOL

CROSS REFERENCE TO RELATED APPLICATIONS

The present application is a continuation of PCT patent application no. PCT/JP2022/002023, filed on Jan. 20, 2022, which claims priority to Japanese patent application no. 2021-014833, filed on Feb. 2, 2021, the entire contents of which are incorporated herein by reference.

BACKGROUND

The present application relates to a secondary battery, electronic equipment, and an electric tool.

Development of a lithium ion battery as one of secondary batteries has expanded to applications that require high output power, including electric tools and vehicles. One of methods to achieve high output power is high-rate discharging in which a relatively large current is fed from a battery. Because the high-rate discharging involves feeding of a large current, it is desirable to reduce an internal resistance of the battery. For example, a secondary battery is described that has a structure in which a cutout is provided at a periphery of a negative electrode current collector and a position of a winding termination end of a negative electrode plate is aligned with the cutout.

SUMMARY

The present application relates to a secondary battery, electronic equipment, and an electric tool.

If a technique described in the Background section is applied to a lithium ion battery having a tabless structure, i.e., a structure without a tab for leading out output power of the battery to the outside, a reaction area of electrodes decreases and a battery characteristic can be degraded accordingly. Further, the secondary battery described in the Background section has room for improvement in that attention could have been directed to a relationship between a winding termination end of a negative electrode plate and a coupled portion, more specifically, a weld, and toward improvement of current collection efficiency based on such a relationship.

The present application relates to providing, in an embodiment, a secondary battery that achieves improved current collection efficiency, and to providing electronic equipment and an electric tool that each include the secondary battery.

The present application provides, in an embodiment, a secondary battery including an electrode wound body, a positive electrode current collector plate, a negative electrode current collector plate, and a battery can. The electrode wound body has a structure in which a positive electrode having a band shape and a negative electrode having a band shape are stacked with a separator interposed therebetween. The battery can contains the electrode wound body, the positive electrode current collector plate, and the negative electrode current collector plate.

The positive electrode includes, on a positive electrode foil having a band shape, a positive electrode active material covered part covered with a positive electrode active material layer, and a positive electrode active material uncovered part.

The negative electrode includes, on a negative electrode foil having a band shape, a negative electrode active material covered part covered with a negative electrode active material layer, and a negative electrode active material uncovered part extending in a longitudinal direction of the negative electrode foil.

The positive electrode active material uncovered part is welded to the positive electrode current collector plate at one of end faces of the electrode wound body.

The negative electrode active material uncovered part is welded to the negative electrode current collector plate at another of the end faces of the electrode wound body.

The positive electrode current collector plate and the negative electrode current collector plate each include weld groups that are provided radially.

The positive electrode active material uncovered part includes a first weld that is nearest to a winding termination end of the positive electrode foil, and a second weld that is second nearest to the winding termination end of the positive electrode foil after the first weld.

The negative electrode active material uncovered part includes a third weld that is nearest to a winding termination end of the negative electrode foil, and a fourth weld that is second nearest to the winding termination end of the negative electrode foil after the third weld.

The secondary battery satisfies Expressions (1) and (2) below:

$$0 \le LC1 \le LC2 \tag{1}$$

$$0 \le LA1 \le LA2 \tag{2}$$

where LC1 represents a distance from the winding termination end of the positive electrode foil to the first weld in millimeters, LC2 represents a distance from the first weld to the second weld in millimeters, LA1 represents a distance from the winding termination end of the negative electrode foil to the third weld in millimeters, and LA2 represents a distance from the third weld to the fourth weld in millimeters.

At least an embodiment of the present application makes it possible to improve the current collection efficiency of the secondary battery. It should be understood that the contents of the present application are not to be construed as being limited by the effects exemplified herein.

BRIEF DESCRIPTION OF THE FIGURES

FIG. 19 is a coupling diagram for use to describe an electric tool as an application example.

DETAILED DESCRIPTION

One or more embodiments of the present application are described below in further detail including with reference to the drawings and examples, and the content of the present application is not limited thereto. It is to be noted that in order to facilitate understanding of description, some features or components in any of the drawings may be enlarged, emphasized, or reduced, or illustration of some portions may be simplified.

Figure 1:
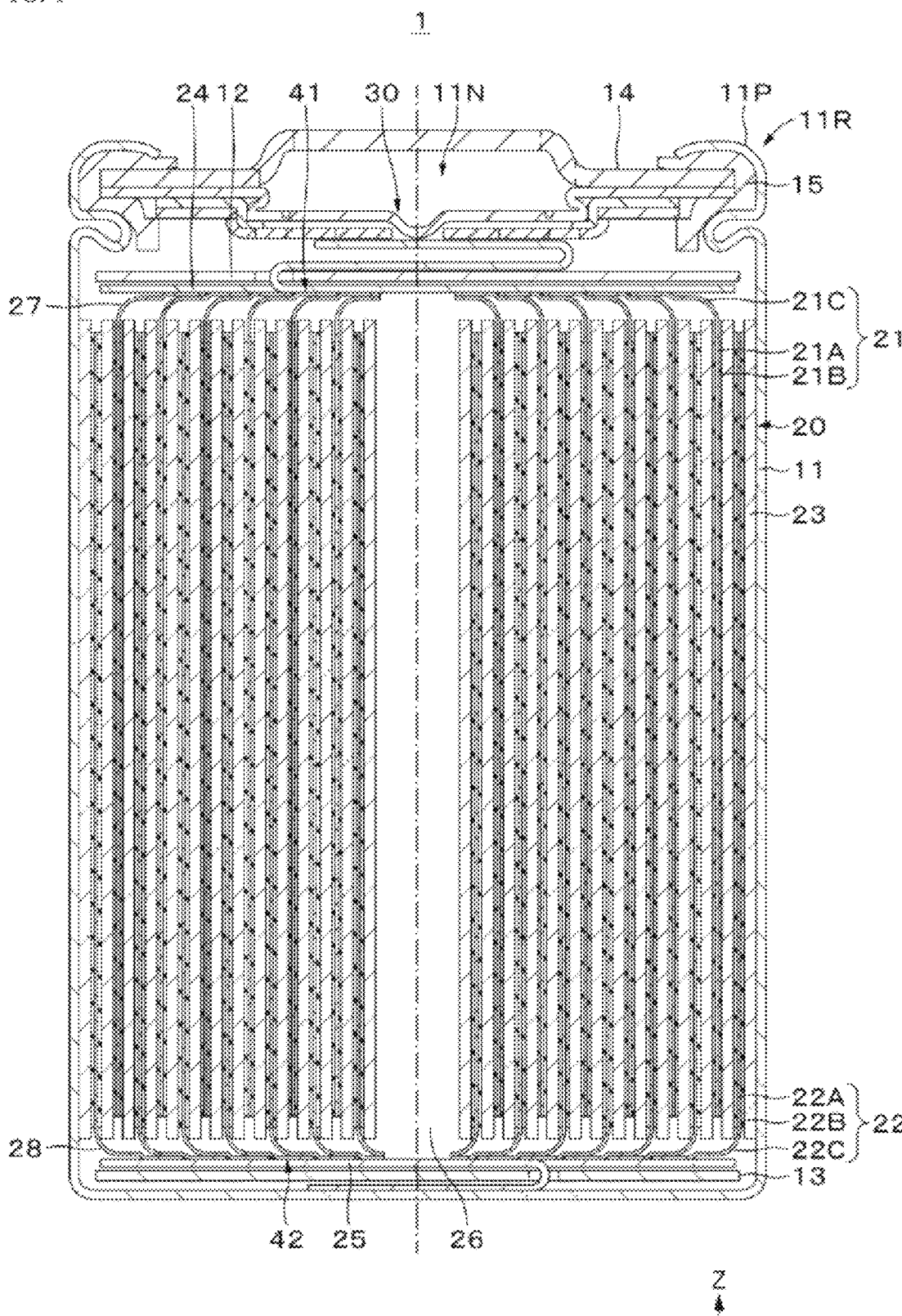
FIG. 1 is a sectional view of a lithium ion battery according to an embodiment.

In an embodiment, a lithium ion battery having a cylindrical shape will be described as an example of a secondary battery. A configuration example of a lithium ion battery according to an embodiment, i.e., a lithium ion battery 1, will be described with reference to FIGS. 1 to 9. FIG. 1 is a schematic sectional view of the lithium ion battery 1. As illustrated in FIG. 1, the lithium ion battery 1 has a cylindrical shape and includes an electrode wound body 20 contained inside a battery can 11, for example. In the following description, unless otherwise specified, a horizontal direction in the plane of FIG. 1 will be referred to as an X-axis direction, a direction into the plane of FIG. 1 will be referred to as a Y-axis direction, and a vertical direction, i.e., a direction of extension of a central axis (an axis represented by a dot-and-dash line in FIG. 1) of the lithium ion battery 1 in the plane of FIG. 1 will be referred to as a Z-axis direction, as appropriate. The central axis will also be referred to as a winding axis as appropriate.

In a schematic configuration, the lithium ion battery 1 includes the battery can 11 having a cylindrical shape, and also includes, inside the battery can 11, a pair of insulators 12 and 13 and the electrode wound body 20. Note that the lithium ion battery 1 may further include, for example, one or more of devices and members including, without limitation, a thermosensitive resistive device or a PTC device and a reinforcing member, inside the battery can 11.

The battery can 11 is a member that contains mainly the electrode wound body 20. The battery can 11 is, for example, a cylindrical container with one end face open and another end face closed. That is, the battery can 11 has one open end face (an open end face 11N). The battery can 11 includes, for example, one or more of metal materials including, without limitation, iron, aluminum, and alloys thereof. The battery can 11 may have a surface plated with one or more of metal materials including, without limitation, nickel, for example.

The insulators 12 and 13 are disk-shaped plates each having a surface that is substantially perpendicular to a central axis of the electrode wound body 20. The central axis passes through substantially a center of each of end faces of the electrode wound body 20 and is in a direction parallel to a Z-axis in FIG. 1. The insulators 12 and 13 are so disposed as to allow the electrode wound body 20 to be interposed therebetween, for example.

A battery cover 14 and a safety valve mechanism 30 are crimped to the open end face 11N of the battery can 11 via a gasket 15 to thereby provide a crimped structure 11R (a crimp structure). The battery can 11 is thus sealed, with the electrode wound body 20 and other components being contained inside the battery can 11.

The battery cover 14 is a member that closes the open end face 11N of the battery can 11 mainly in the state where the electrode wound body 20 and the other components are contained inside the battery can 11. The battery cover 14 includes, for example, a material similar to the material included in the battery can 11. A middle region of the battery cover 14 protrudes in a +Z direction, for example. A region other than the middle region, that is, a peripheral region, of the battery cover 14 is thus in contact with the safety valve mechanism 30, for example.

The gasket 15 is a member that is mainly interposed between the battery can 11 (a bent part 11P) and the battery cover 14 to thereby seal a gap between the bent part 11P and the battery cover 14. Note that the gasket 15 may have a surface coated with a material such as asphalt, for example.

The gasket 15 includes one or more of insulating materials, for example. The insulating material is not particularly limited in kind. For example, a polymer material such as polybutylene terephthalate (PBT) or polypropylene (PP) may be used as the insulating material. In particular, the insulating material is preferably polybutylene terephthalate. A reason for this is that such a material is able to sufficiently seal the gap between the bent part 11P and the battery cover 14 while electrically separating the battery can 11 and the battery cover 14 from each other.

The safety valve mechanism 30 cancels the sealed state of the battery can 11 and thereby releases a pressure inside the battery can 11, i.e., an internal pressure of the battery can 11 on an as-needed basis, mainly upon an increase in the internal pressure. Examples of a cause of the increase in the internal pressure of the battery can 11 include a gas generated due to a decomposition reaction of an electrolytic solution during charging and discharging.

In the lithium ion battery 1 having a cylindrical shape, a positive electrode 21 having a band shape and a negative electrode 22 having a band shape, which are stacked with a separator 23 interposed therebetween and are wound in a spiral shape, are contained in the battery can 11, being impregnated with the electrolytic solution. The positive electrode 21 includes a positive electrode foil 21A with a positive electrode active material layer 21B provided on one of or each of both surfaces of the positive electrode foil 21A. A material of the positive electrode foil 21A is a metal foil including, for example, aluminum or an aluminum alloy. The negative electrode 22 includes a negative electrode foil 22A with a negative electrode active material layer 22B provided on one of or each of both surfaces of the negative electrode foil 22A. A material of the negative electrode foil 22A is a metal foil including, for example, nickel, a nickel alloy, copper, or a copper alloy. The separator 23 is a porous insulating film. The separator 23 electrically insulates the positive electrode 21 and the negative electrode 22 from each other, and allows for movement of substances including, without limitation, ions and the electrolytic solution.

Figure 2:
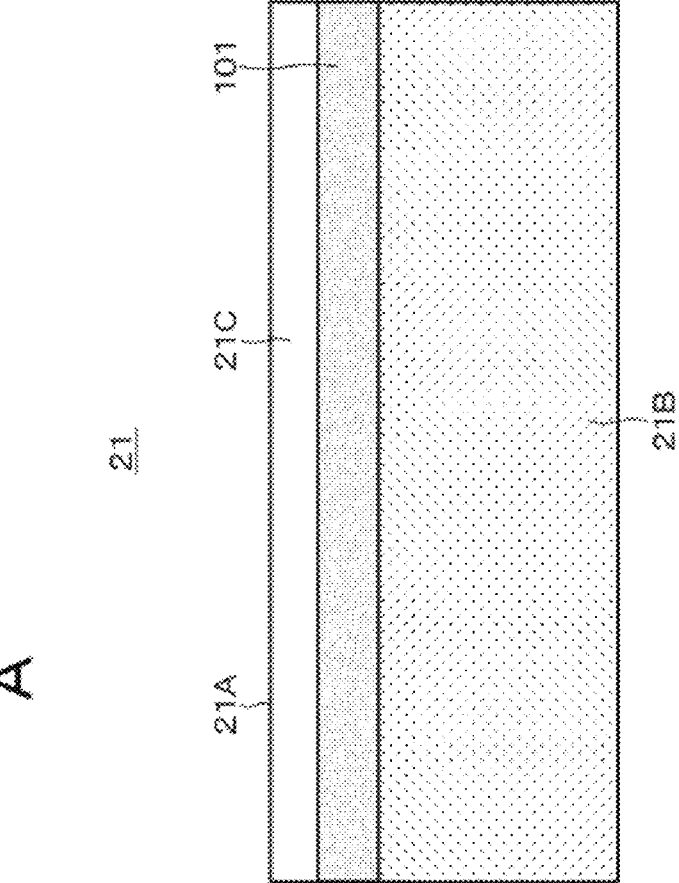
FIG. 2 includes views A and B that are diagrams for describing a positive electrode according to an embodiment.

FIG. 2, view A is a front view of the positive electrode 21 before being wound. FIG. 2, view B is a side view of the positive electrode 21 of FIG. 2, view A. The positive electrode 21 includes, at each of one major surface and another major surface of the positive electrode foil 21A, a part (a part shaded with dots) covered with the positive electrode active material layer 21B, and a positive electrode active material uncovered part 21C which is a part not covered with the positive electrode active material layer 21B. Note that in the following description, the part covered with the positive electrode active material layer 21B will be referred to as a positive electrode active material covered part 21B as appropriate. The positive electrode 21 may have a configuration in which the positive electrode active material covered part 21B is provided at one of the major surfaces of the positive electrode foil 21A. Further, in the present embodiment, an insulating layer 101 (a part shaded with gray in FIG. 2, views A and B) is provided between the positive electrode active material covered part 21B and the positive electrode active material uncovered part 21C.

Figure 3:
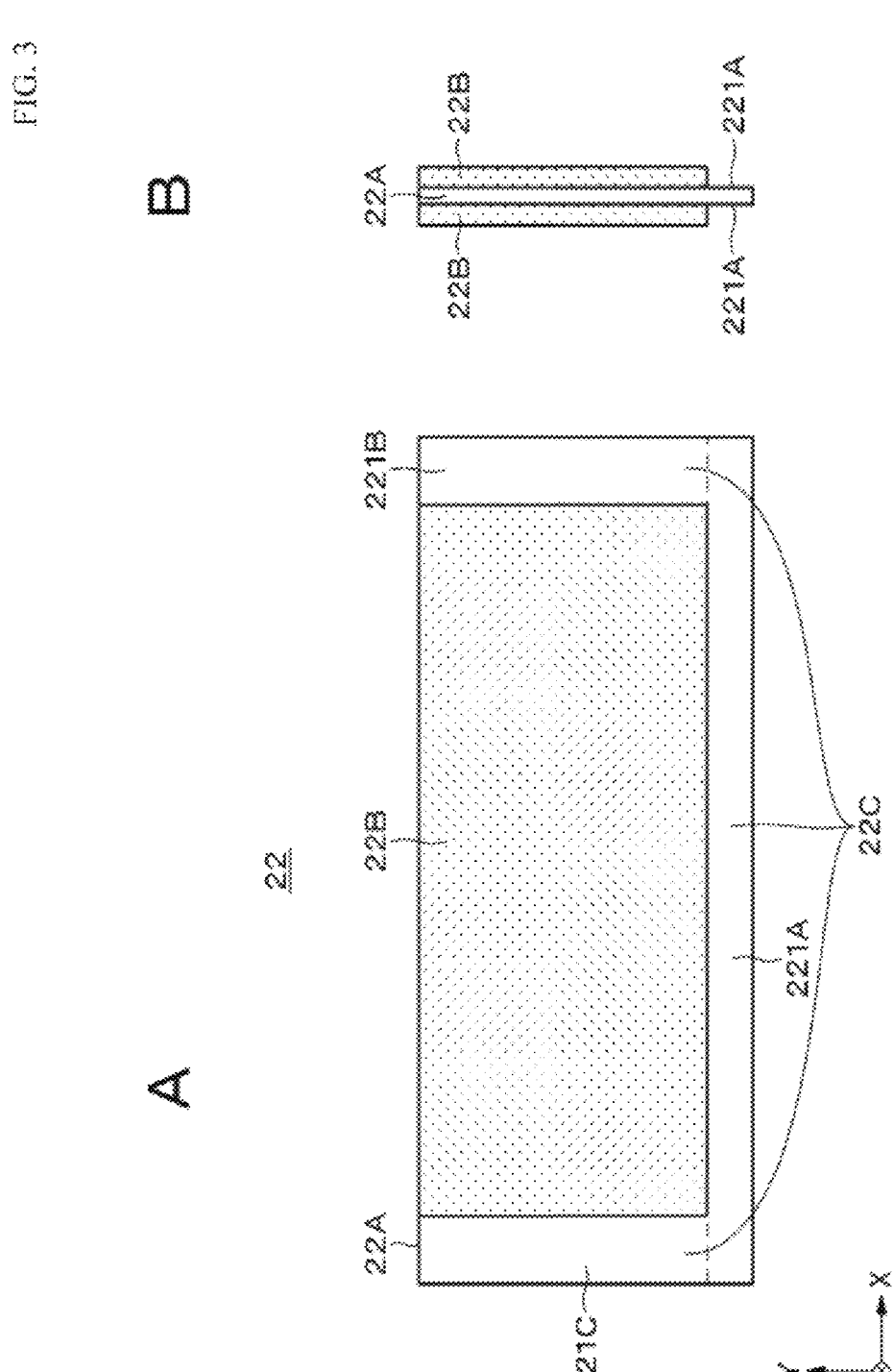
FIG. 3 includes views A and B that are diagrams for describing a negative electrode according to an embodiment.

FIG. 3, view A is a front view of the negative electrode 22 before being wound. FIG. 3, view B is a side view of the negative electrode 22 of FIG. 3, view A. The negative electrode 22 includes, at each of one major surface and another major surface of the negative electrode foil 22A, a part (a part shaded with dots) covered with the negative electrode active material layer 22B, and a negative electrode active material uncovered part 22C which is a part not covered with the negative electrode active material layer 22B. Note that in the following description, the part covered with the negative electrode active material layer 22B will be referred to as a negative electrode active material covered part 22B as appropriate. The negative electrode 22 may have a configuration in which the negative electrode active material covered part 22B is provided at one of the major surfaces of the negative electrode foil 22A.

As illustrated in FIG. 3, view A, the negative electrode active material uncovered part 22C includes, for example, a first negative electrode active material uncovered part 221A, a second negative electrode active material uncovered part 221B, and a third negative electrode active material uncovered part 221C. The first negative electrode active material uncovered part 221A extends in a longitudinal direction of the negative electrode 22, i.e., in the X-axis direction in FIG. 3. The second negative electrode active material uncovered part 221B is provided on a winding start side of the negative electrode 22 and extends in a transverse direction of the negative electrode 22, i.e., in the Y-axis direction in FIG. 3, which will also be referred to as a width direction as appropriate. The third negative electrode active material uncovered part 221C is provided on a winding termination side of the negative electrode 22 and extends in the transverse direction of the negative electrode 22, i.e., in the Y-axis direction in FIG. 3. Note that in FIG. 3, view A, a boundary between the first negative electrode active material uncovered part 221A and the second negative electrode active material uncovered part 221B, and a boundary between the first negative electrode active material uncovered part 221A and the third negative electrode active material uncovered part 221C are each represented by a dashed line.

In the electrode wound body 20 of the lithium ion battery 1 having the cylindrical shape according to the present embodiment, the positive electrode 21 and the negative electrode 22 are laid over each other and wound, with the separator 23 interposed therebetween, in such a manner that the positive electrode active material uncovered part 21C and the first negative electrode active material uncovered part 221A face toward opposite directions.

The electrode wound body 20 has a through hole 26 at a center thereof. Specifically, the through hole 26 is a hole part that develops at substantially a center of a stack in which the positive electrode 21, the negative electrode 22, and the separator 23 are stacked. The through hole 26 is used as a hole into which a rod-shaped welding tool, which will hereinafter be referred to as a welding rod, as appropriate, is to be inserted in a process of assembling the lithium ion battery 1.

Figure 4:
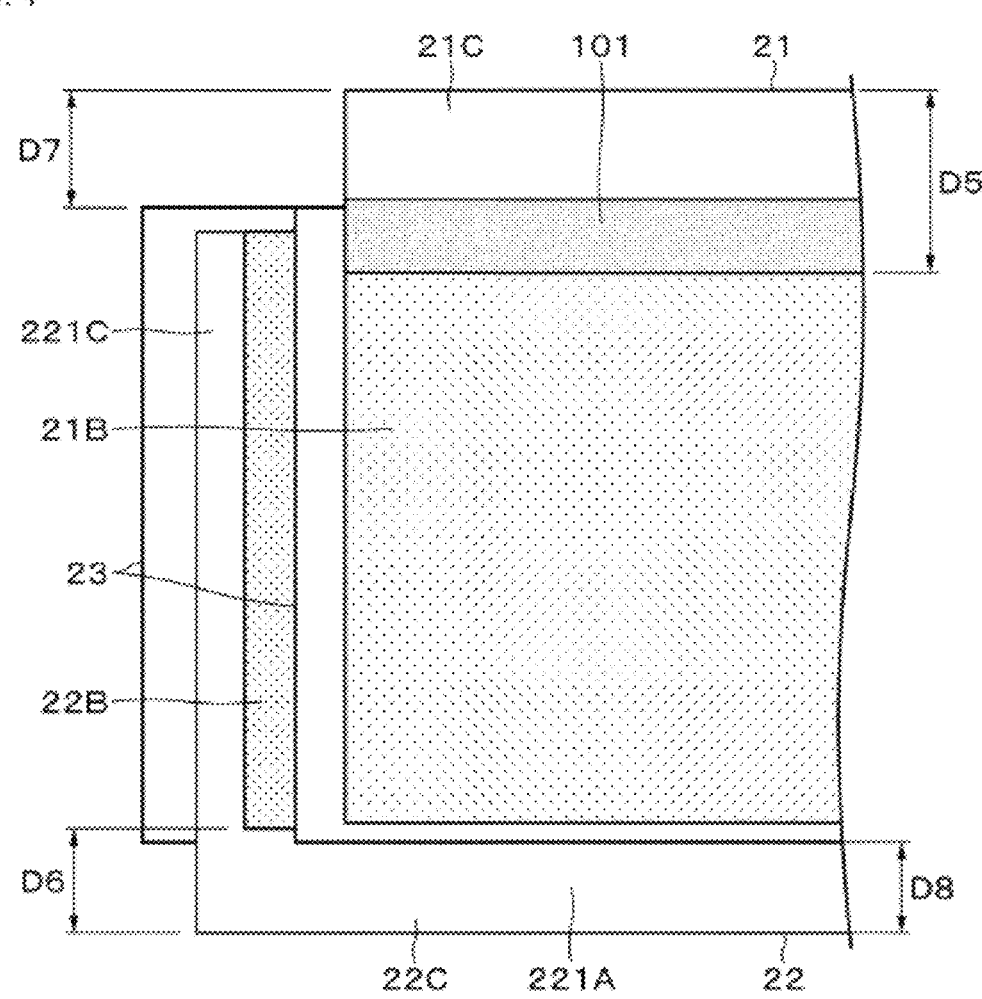
FIG. 4 is a diagram illustrating the positive electrode, the negative electrode, and a separator before being wound.

Details of the electrode wound body 20 will be described. FIG. 4 illustrates an example of a pre-winding structure in which the positive electrode 21, the negative electrode 22, and the separator 23 are stacked. The positive electrode 21 further includes the insulating layer 101 (a gray region part in FIG. 4) covering a boundary between the positive electrode active material covered part 21B (a part lightly shaded with dots in FIG. 4) and the positive electrode active material uncovered part 21C. The insulating layer 101 has a length in the width direction of about 3 mm, for example. All of a region of the positive electrode active material uncovered part 21C opposed to the negative electrode active material covered part 22B with the separator 23 interposed therebetween is covered with the insulating layer 101. The insulating layer 101 has an effect of reliably preventing an internal short circuit of the lithium ion battery 1 when foreign matter enters between the negative electrode active material covered part 22B and the positive electrode active material uncovered part 21C. In addition, the insulating layer 101 has an effect of, in a case where the lithium ion battery 1 undergoes an impact, absorbing the impact and thereby reliably preventing the positive electrode active material uncovered part 21C from bending and short-circuiting with the negative electrode 22.

Here, as illustrated in FIG. 4, a length of the positive electrode active material uncovered part 21C in the width direction is denoted as D5, and a length of the first negative electrode active material uncovered part 221A in the width direction is denoted as D6. In an embodiment, it is preferable that D5>D6. For example, D5=7 (mm), and D6=4 (mm). Where a length of a portion of the positive electrode active material uncovered part 21C protruding from one end in the width direction of the separator 23 is denoted as D7 and a length of a portion of the first negative electrode active material uncovered part 221A protruding from another end in the width direction of the separator 23 is denoted as D8, in an embodiment it is preferable that D7>D8. For example, D7=4.5 (mm), and D8=3 (mm).

The positive electrode foil 21A and the positive electrode active material uncovered part 21C include aluminum, for example. The negative electrode foil 22A and the negative electrode active material uncovered part 22C include copper, for example. Thus, the positive electrode active material uncovered part 21C is typically softer, that is, lower in Young's modulus, than the negative electrode active material uncovered part 22C. Accordingly, in an embodiment, it is more preferable that D5>D6 and D7>D8. In such a case, when portions of the positive electrode active material uncovered part 21C and portions of the negative electrode active material uncovered part 22C are simultaneously bent with equal pressures from both electrode sides, respective heights of the bent portions as measured from respective ends of the separator 23 may be substantially the same between the positive electrode 21 and the negative electrode 22. In this situation, the portions of the positive electrode active material uncovered part 21C appropriately overlap with each other when bent, which makes it possible to easily couple the positive electrode active material uncovered part 21C and a positive electrode current collector plate 24 to each other by laser welding in a process of fabricating the lithium ion battery 1. Further, the portions of the negative electrode active material uncovered part 22C appropriately overlap with each other when bent, which makes it possible to easily couple the negative electrode active material uncovered part 22C and a negative electrode current collector plate 25 to each other by laser welding in the process of fabricating the lithium ion battery 1. Details of the process of fabricating the lithium ion battery 1 will be described later.

In a typical lithium ion battery, for example, a lead for current extraction is welded at one location on each of the positive electrode and the negative electrode. However, such a configuration is not suitable for high-rate discharging because a high internal resistance of the battery results to cause the lithium ion battery to generate heat and become hot during discharging. To address this, in the lithium ion battery 1 according to the present embodiment, the positive electrode current collector plate 24 is disposed on one end face, i.e., an end face 41, of the electrode wound body 20, and the negative electrode current collector plate 25 is disposed on another end face, i.e., an end face 42, of the electrode wound body 20. In addition, the positive electrode current collector plate 24 and the positive electrode active material uncovered part 21C located at the end face 41 are welded to each other at multiple points; and the negative electrode current collector plate 25 and the negative electrode active material uncovered part 22C (specifically, the first negative electrode active material uncovered part 221A) located at the end face 42 are welded to each other at multiple points. The internal resistance of the lithium ion battery 1 is thereby kept low to allow for high-rate discharging.

Figure 5:
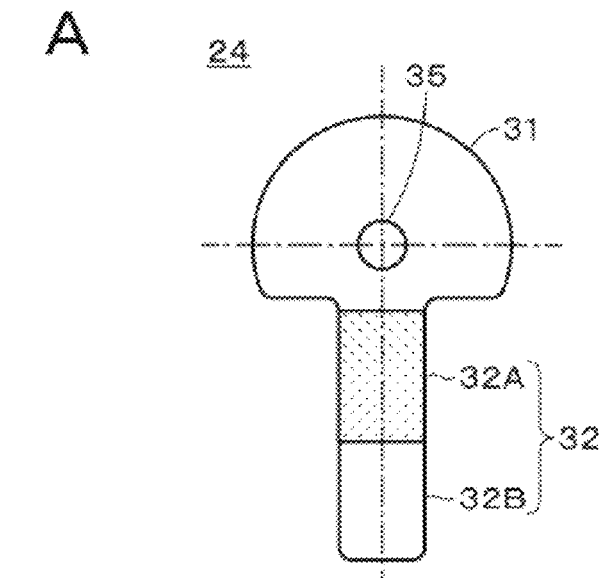
FIG. 5 includes views A and B, where view A is a plan view of a positive electrode current collector plate according to an embodiment, and where view B is a plan view of a negative electrode current collector plate according to an embodiment.
Figure 5:
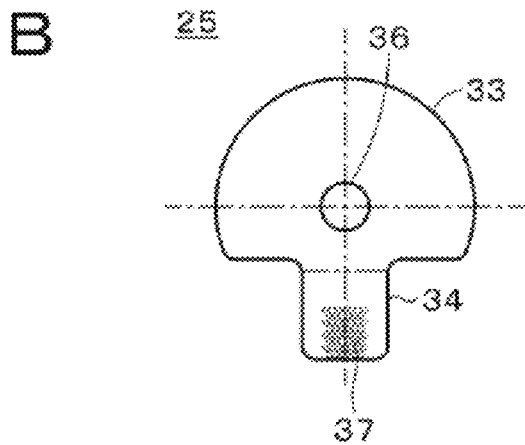

FIG. 5, views A and B, illustrate respective examples of the current collector plates. FIG. 5, view A illustrates the positive electrode current collector plate 24. FIG. 5, view B illustrates the negative electrode current collector plate 25. The positive electrode current collector plate 24 and the negative electrode current collector plate 25 are contained in the battery can 11 (see FIG. 1). A material of the positive electrode current collector plate 24 is a metal plate including, for example, a simple substance or a composite material of aluminum or an aluminum alloy. A material of the negative electrode current collector plate 25 is a metal plate including, for example, a simple substance or a composite material of nickel, a nickel alloy, copper, or a copper alloy. As illustrated in FIG. 5, view A, the positive electrode current collector plate 24 has a shape in which an upper portion of a band-shaped part 32 having a rectangular shape is attached to a fan-shaped part 31 having a flat fan shape.

The fan-shaped part 31 corresponds to an example of a positive electrode side fan-shaped part. The band-shaped part 32 corresponds to an example of a positive electrode side band-shaped part. The fan-shaped part 31 has a hole 35 at a position near a middle thereof. The position of the hole 35 corresponds to a position of the through hole 26.

A part shaded with dots in FIG. 5, view A represents an insulating part 32A in which an insulating tape is attached or an insulating material is applied to the band-shaped part 32. A part below the dot-shaded part in FIG. 5, view A represents a coupling part 32B to be coupled to a sealing plate that also serves as an external terminal. Note that in a case of a battery structure having no metallic center pin (not illustrated) in the through hole 26, the insulating part 32A may be omitted because there is a low possibility of contact of the band-shaped part 32 with a region of a negative electrode potential. In such a case, it is possible to increase charge and discharge capacities by increasing a width of each of the positive electrode 21 and the negative electrode 22 by an amount corresponding to a thickness of the insulating part 32A.

The negative electrode current collector plate 25 is similar to the positive electrode current collector plate 24 in shape, but has a band-shaped part of a different shape. The band-shaped part 34 of the negative electrode current collector plate of FIG. 5, view B is shorter than the band-shaped part 32 of the positive electrode current collector plate 24 and includes no portion corresponding to the insulating part 32A. The band-shaped part 34 corresponds to an example of a negative electrode side band-shaped part. The band-shaped part 34 is provided with circular projections 37 depicted as multiple circles. Upon resistance welding, current is concentrated on the projections 37, causing the projections 37 to melt to thereby cause the band-shaped part 34 to be welded to a bottom of the battery can 11. As with the positive electrode current collector plate 24, the negative electrode current collector plate 25 has a hole 36 at a position near a middle of a fan-shaped part 33. The position of the hole 36 corresponds to the position of the through hole 26. The fan-shaped part 33 corresponds to an example of a negative electrode side fan-shaped part. The fan-shaped part 31 of the positive electrode current collector plate 24 and the fan-shaped part 33 of the negative electrode current collector plate 25, which are each in the shape of a fan, cover respective portions of the end faces 41 and 42. By not covering all of the respective end faces 41 and 42, it is possible to allow the electrolytic solution to smoothly permeate the electrode wound body 20 in assembling the lithium ion battery 1, and it is also possible to facilitate releasing of a gas, which is generated when the lithium ion battery 1 comes into an abnormally hot state or an overcharged state, to the outside of the lithium ion battery 1.

The positive electrode active material layer 21B includes at least a positive electrode material (a positive electrode active material) into which lithium is insertable and from which lithium is extractable, and may further include, for example, a positive electrode binder and a positive electrode conductor. The positive electrode material is preferably a lithium-containing composite oxide or a lithium-containing phosphoric acid compound. The lithium-containing composite oxide has a layered rock-salt crystal structure or a spinel crystal structure, for example. The lithium-containing phosphoric acid compound has an olivine crystal structure, for example.

The positive electrode binder includes a synthetic rubber or a polymer compound. Examples of the synthetic rubber include a styrene-butadiene-based rubber, a fluorine-based rubber, and ethylene propylene diene. Examples of the polymer compound include polyvinylidene difluoride (PVdF) and polyimide.

The positive electrode conductor is a carbon material such as graphite, carbon black, acetylene black, or Ketjen black. Note that the positive electrode conductor may be a metal material or an electrically conductive polymer.

The negative electrode foil 22A configuring the negative electrode 22 is preferably roughened at its surface to achieve improved adherence to the negative electrode active material layer 22B. The negative electrode active material layer 22B includes at least a negative electrode material (a negative electrode active material) into which lithium is insertable and from which lithium is extractable, and may further include, for example, a negative electrode binder and a negative electrode conductor.

The negative electrode material includes a carbon material, for example. The carbon material is graphitizable carbon, non-graphitizable carbon, graphite, low-crystalline carbon, or amorphous carbon. The carbon material has a fibrous shape, a spherical shape, a granular shape, or a flaky shape.

Further, the negative electrode material includes a metal-based material, for example. Examples of the metal-based material include Li (lithium), Si (silicon), Sn (tin), Al (aluminum), Zr (zinc), and Ti (titanium). A metallic element forms a compound, a mixture, or an alloy with another element, and examples thereof include silicon oxide ($SiO_x$ ($0 < x \leq 2$)), silicon carbide (SiC), an alloy of carbon and silicon, and lithium titanium oxide (LTO).

The separator 23 is a porous film including a resin, and may be a stacked film including two or more kinds of porous films. Examples of the resin include polypropylene and polyethylene. With the porous film as a base layer, the separator 23 may include a resin layer provided on one of or each of both surfaces of the base layer. A reason for this is that this improves adherence of the separator 23 to each of the positive electrode 21 and the negative electrode 22 and thus suppresses distortion of the electrode wound body 20.

The resin layer includes a resin such as PVdF. In a case of forming the resin layer, a solution including an organic solvent and the resin dissolved therein is applied on the base layer, following which the base layer is dried. Note that the base layer may be immersed in the solution and thereafter the base layer may be dried. From the viewpoint of improving heat resistance and battery safety, the resin layer preferably includes inorganic particles or organic particles. Examples of the kind of the inorganic particles include aluminum oxide, aluminum nitride, aluminum hydroxide, magnesium hydroxide, boehmite, talc, silica, and mica. Alternatively, a surface layer including inorganic particles as a main component and formed by a method such as a sputtering method or an atomic layer deposition (ALD) method may be used instead of the resin layer.

The electrolytic solution includes a solvent and an electrolyte salt, and may further include other materials such as additives on an as-needed basis. The solvent is a nonaqueous solvent such as an organic solvent, or water. The electrolytic solution including a nonaqueous solvent is called a nonaqueous electrolytic solution. Examples of the nonaqueous solvent include a cyclic carbonic acid ester, a chain carbonic acid ester, a lactone, a chain carboxylic acid ester, and a nitrile (mononitrile).

Although a typical example of the electrolyte salt is a lithium salt, the electrolyte salt may include any salt other than the lithium salt. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts may also be used in mixture with each other. From the viewpoint of improving a battery characteristic, it is preferable to use a mixture of $LiPF_6$ and $LiBF_4$, in particular. Although not particularly limited, a content of the electrolyte salt is preferably in a range from 0.3 mol/kg to 3 mol/kg both inclusive with respect to the solvent.

Next, a description will be given of an example of a welded structure of the lithium ion battery 1 having the above-described configuration. In the lithium ion battery 1, portions of the positive electrode active material uncovered part 21C are exposed at the end face 41 of the electrode wound body 20 having a substantially cylindrical shape, and portions of the first negative electrode active material uncovered part 221A are exposed at the end face 42 of the electrode wound body 20. A side of the electrode wound body 20 on which the portions of the positive electrode active material uncovered part 21C are exposed at the end face 41 will be referred to as a positive electrode side of the electrode wound body 20 as appropriate. A side of the electrode wound body 20 on which the portions of the first negative electrode active material uncovered part 221A are exposed at the end face 42 will be referred to as a negative electrode side of the electrode wound body 20.

Figure 6:
FIG. 6 is a partial enlarged sectional diagram for describing a configuration of an electrode wound body according to an embodiment.

In the process of fabricating the lithium ion battery 1, the portions of the positive electrode active material uncovered part 21C exposed at the end face 41 are bent. FIG. 6 is a partial enlarged sectional view of the positive electrode side of the electrode wound body 20. As illustrated in FIG. 6, the portions of the positive electrode active material uncovered part 21C are bent and overlap with each other in layers to form a flat surface 71, which is a substantially flat surface. The flat surface 71 corresponds to an example of a positive electrode side flat surface. The positive electrode current collector plate 24 is coupled to the flat surface 71 by, for example, laser welding. For example, with one major surface of the fan-shaped part 31 of the positive electrode current collector plate 24 caused to face the flat surface 71 and brought into contact with the flat surface 71, another major surface 24A of the fan-shaped part 31 is irradiated with laser light Lbm. This causes the flat surface 71 and the positive electrode current collector plate 24 to be welded to each other.

Figure 7:
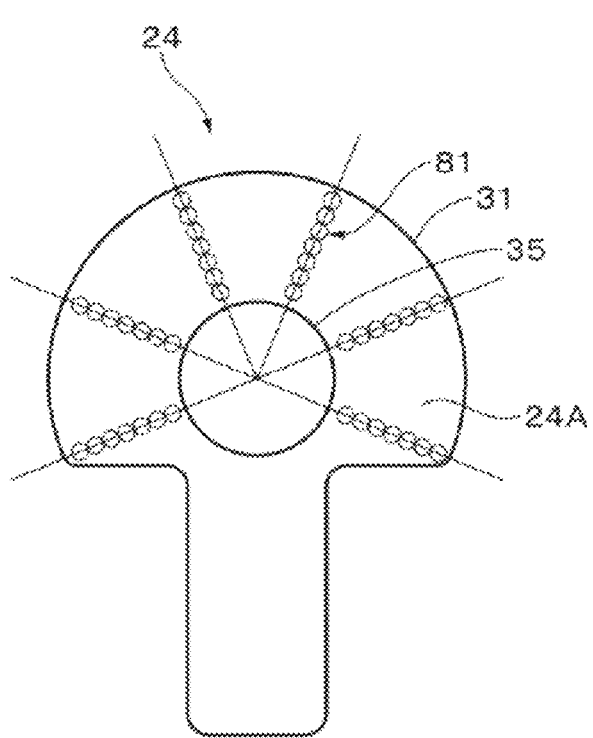
FIG. 7 is a diagram for describing an example of a weld group provided on the positive electrode current collector plate.

FIG. 7 is a diagram illustrating the positive electrode current collector plate 24 after undergoing laser welding. Specifically, the fan-shaped part 31 of the positive electrode current collector plate 24 is irradiated with the laser light Lbm. The laser welding is performed by, for example, continuous irradiation while changing irradiation positions from a vicinity of a perimeter of the hole 35 toward an outer side, with output power of the laser light Lbm kept constant. A weld group 81 including multiple welds is thereby formed. Here, the term "weld" refers to a welded portion between the flat surface 71 and the positive electrode current collector plate 24, and is schematically represented by a circle in the drawings including FIGS. 7 and 9. The positive electrode current collector plate 24 according to the present embodiment has multiple weld groups 81 that are formed radially. The term "radially" refers to being arranged in such a manner as to diverge in lines from a common starting point, i.e., a center of the hole 35 in this example, and such a manner of arrangement is represented by lines passing through the center of the hole 35 or the hole 36 in the drawings including FIGS. 7 and 9. As illustrated in FIG. 7, the positive electrode current collector plate 24 has six weld groups 81, for example.

Figure 8:
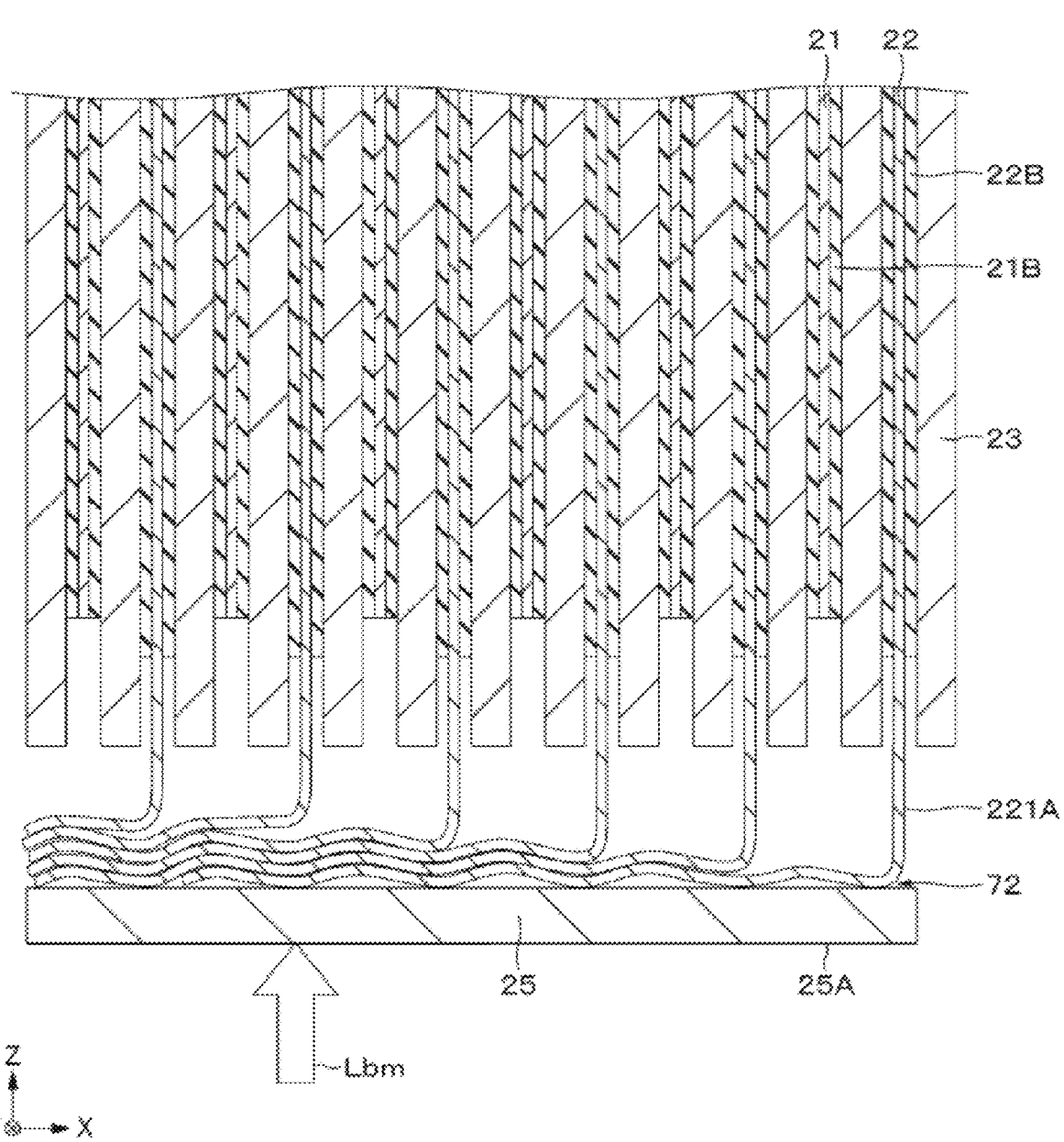
FIG. 8 is a partial enlarged sectional diagram for describing the configuration of the electrode wound body according to an embodiment.

Further, in the process of fabricating the lithium ion battery 1, the portions of the first negative electrode active material uncovered part 221A exposed at the end face 42 are bent. FIG. 8 is a partial enlarged sectional view of the negative electrode side of the electrode wound body 20. As illustrated in FIG. 8, the portions of the first negative electrode active material uncovered part 221A are bent and overlap with each other in layers to form a flat surface 72, which is a substantially flat surface. The flat surface 72 corresponds to an example of a negative electrode side flat surface. The negative electrode current collector plate 25 is coupled to the flat surface 72 by, for example, laser welding. For example, with one major surface of the fan-shaped part 33 of the negative electrode current collector plate 25 caused to face the flat surface 72 and brought into contact with the flat surface 72, another major surface 25A of the fan-shaped part 33 is irradiated with the laser light Lbm. This causes the flat surface 72 and the negative electrode current collector plate 25 to be welded to each other.

Figure 9:
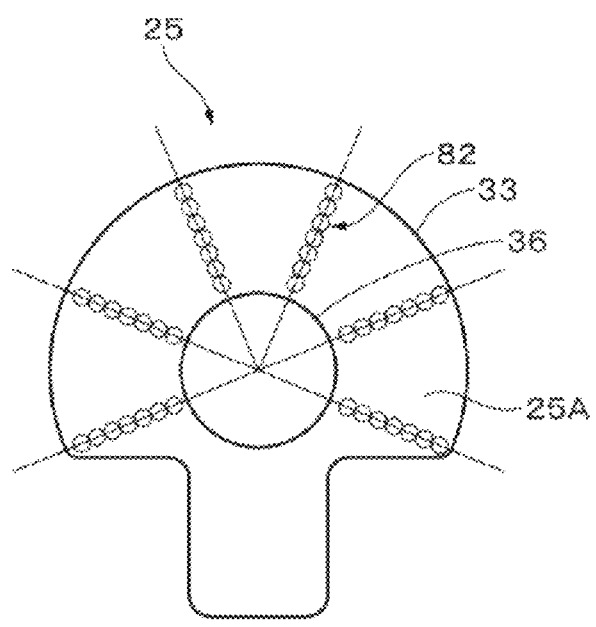
FIG. 9 is a diagram for describing an example of a weld group provided on the negative electrode current collector plate.

FIG. 9 is a diagram illustrating the negative electrode current collector plate 25 after undergoing laser welding. Specifically, the fan-shaped part 33 of the negative electrode current collector plate 25 is irradiated with the laser light Lbm. The laser welding is performed by, for example, continuous irradiation while changing irradiation positions from a vicinity of a perimeter of the hole 36 toward the outer side, with the output power of the laser light Lbm kept constant. A weld group 82 including multiple welds is thereby formed. The negative electrode current collector plate 25 according to the present embodiment has multiple weld groups 82 that are formed radially. As illustrated in FIG. 9, the negative electrode current collector plate 25 has six weld groups 82, for example.

As used herein, the term "flat surface" encompasses not only a completely flat surface but also a surface having some asperities or surface roughness to the extent that it is possible to couple the positive electrode active material uncovered part 21C and the positive electrode current collector plate 24 to each other and to couple the first negative electrode active material uncovered part 221A and the negative electrode current collector plate 25 to each other.

To achieve efficient charging and discharging of the lithium ion battery 1, it is important to provide a larger number of current collection points, i.e., welds, that allow for input and output of electrons from the positive electrode active material covered part 21B, and to dispose the welds uniformly over an electrode reaction area to thereby reduce resistance when the electrons are transferred. However, the lithium ion battery 1 according to the present embodiment has a structure in which the positive electrode 21 having a band shape and the negative electrode 22 having a band shape are wound in a spiral shape. Accordingly, in order for the welds to be disposed uniformly, the welds have to be disposed in a random arrangement. The random arrangement of the welds greatly increases a welding time, leading to degraded productivity and increased cost. It is thus desirable that the welds be disposed to be connected to each other in a line shape including a straight line or a curved line. Further, the positive electrode current collector plate 24 is provided with the band-shaped part 32 to be electrically continuous with a sealing member, thus being shaped to limit a weldable region. Similarly, the negative electrode current collector plate 25 is also provided with the band-shaped part 34 to be electrically continuous with the bottom of the battery can 11, thus being shaped to limit a weldable region, as with the positive electrode 21. Consideration is to be given to such points also.

Based upon the above-described points, positions of the welds allowing for high current collection efficiency has been investigated. As a result, it has been found that unless a position of the weld in the vicinity of a winding termination end is defined, uniformity of current collection becomes greatly out of balance to result in characteristic degradation. The present embodiment defines a positional relationship between the winding termination end and the welds to achieve improved current collection efficiency, thereby making it possible to provide a secondary battery that is low in internal resistance and high in output power. A detailed description will be given below.

Figure 10:
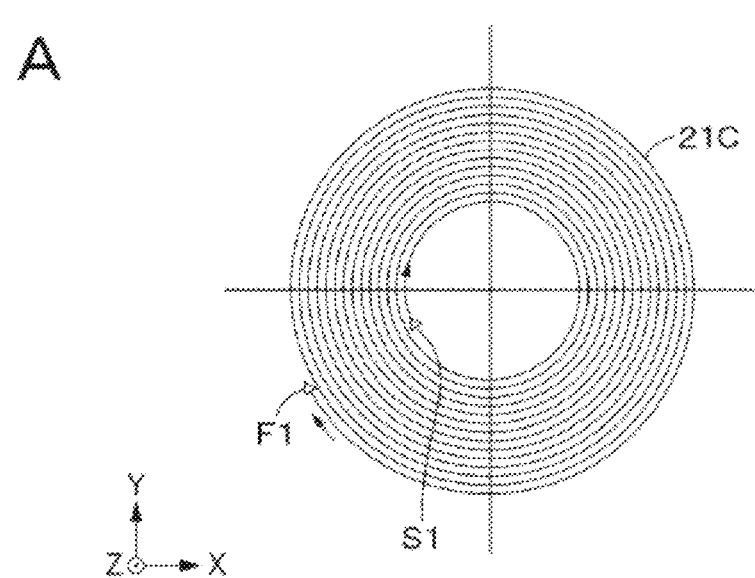
FIG. 10 includes views A and B, where view A is a diagram for describing an example of a winding start end and a winding termination end, and where view B is a diagram for describing an example of a positional relationship between the winding termination end and each of a first weld and a second weld.
Figure 10:
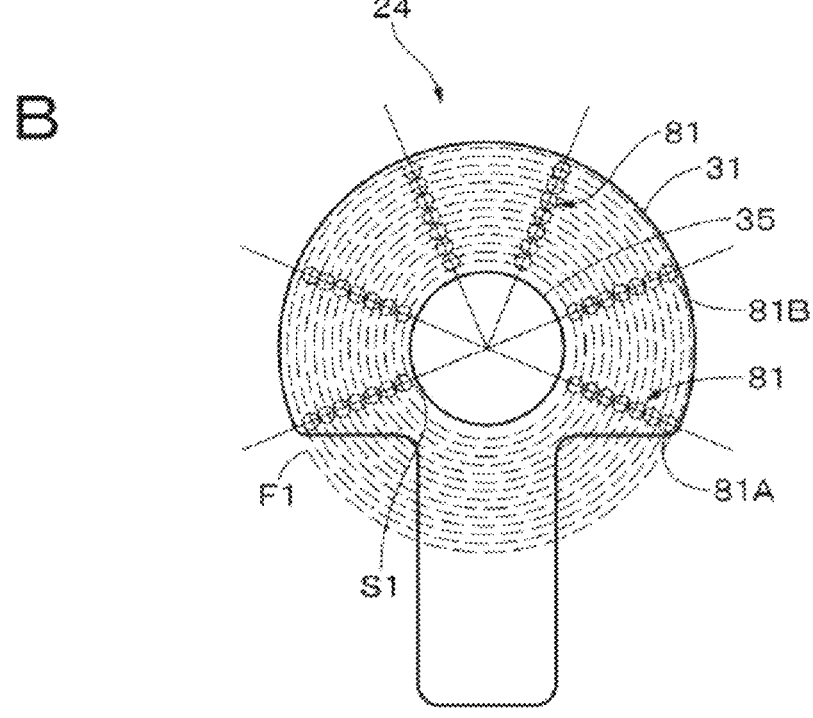
Figure 11:
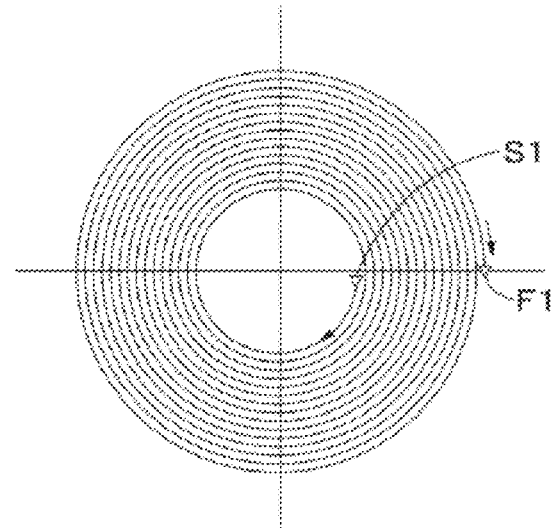
FIG. 11 includes views A and B, where view A is a diagram for describing another example of the winding start end and the winding termination end, and where view B is a diagram for describing another example of the positional relationship between the winding termination end and each of the first weld and the second weld.
Figure 11:
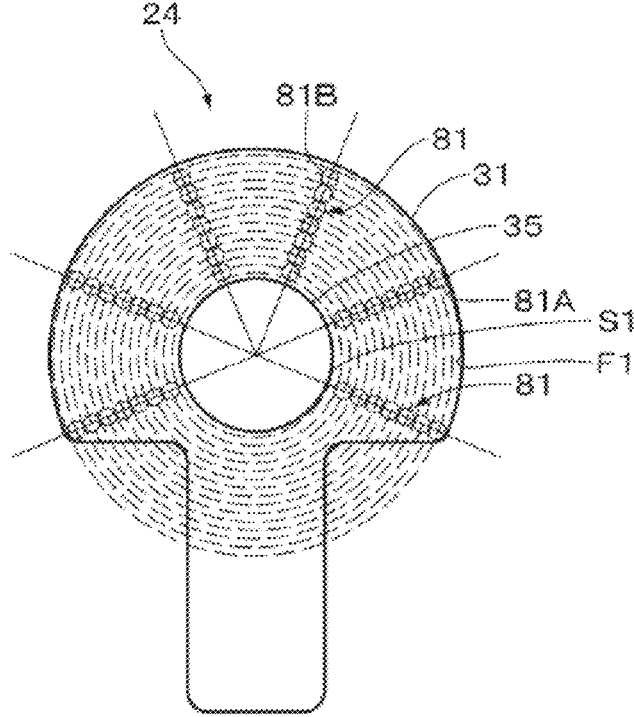

FIG. 10, view A illustrates the positive electrode active material uncovered part 21C exposed at the end face 41, as viewed in a −Z direction. FIG. 10, view B illustrates the positive electrode active material uncovered part 21C of FIG. 10, view A with the positive electrode current collector plate 24 to be laser-welded thereto superimposed on the illustration of the positive electrode active material uncovered part 21C. As illustrated in FIG. 10, view A, the positive electrode 21 which is wound has a winding start end 51 and a winding termination end F1. FIG. 11, views A and B provide the same illustrations as those in FIG. 10, views A and B except that the positions of the winding start end 51 and the winding termination end F1 are different from those in FIG. 10, views A and B.

Here, as viewed along a direction opposite to a winding direction (a direction indicated by an arrow in FIG. 10, view A) from the winding termination end F1 as a starting point, a weld that is nearest to the winding termination end F1 will be referred to as a first weld 81A as appropriate, and a weld that is second nearest to the winding termination end F1 after the weld 81A will be referred to as a second weld 81B as appropriate. FIG. 10, views A and B illustrate an example in which the first weld 81A is far from the winding termination end F1. Specifically, FIG. 10, views A and B illustrate an example in which a distance from the winding termination end F1 to the first weld 81A is greater than a distance from the first weld 81A to the second weld 81B. The distance from the winding termination end F1 to the first weld 81A will hereinafter be referred to as LC1 (in millimeters) as appropriate. The distance from the first weld 81A to the second weld 81B will hereinafter be referred to as LC2 (in millimeters) as appropriate. FIG. 11, views A and B illustrate an example in which the first weld 81A is near to the winding termination end F1, specifically, an example in which LC1<LC2.

Figure 12:
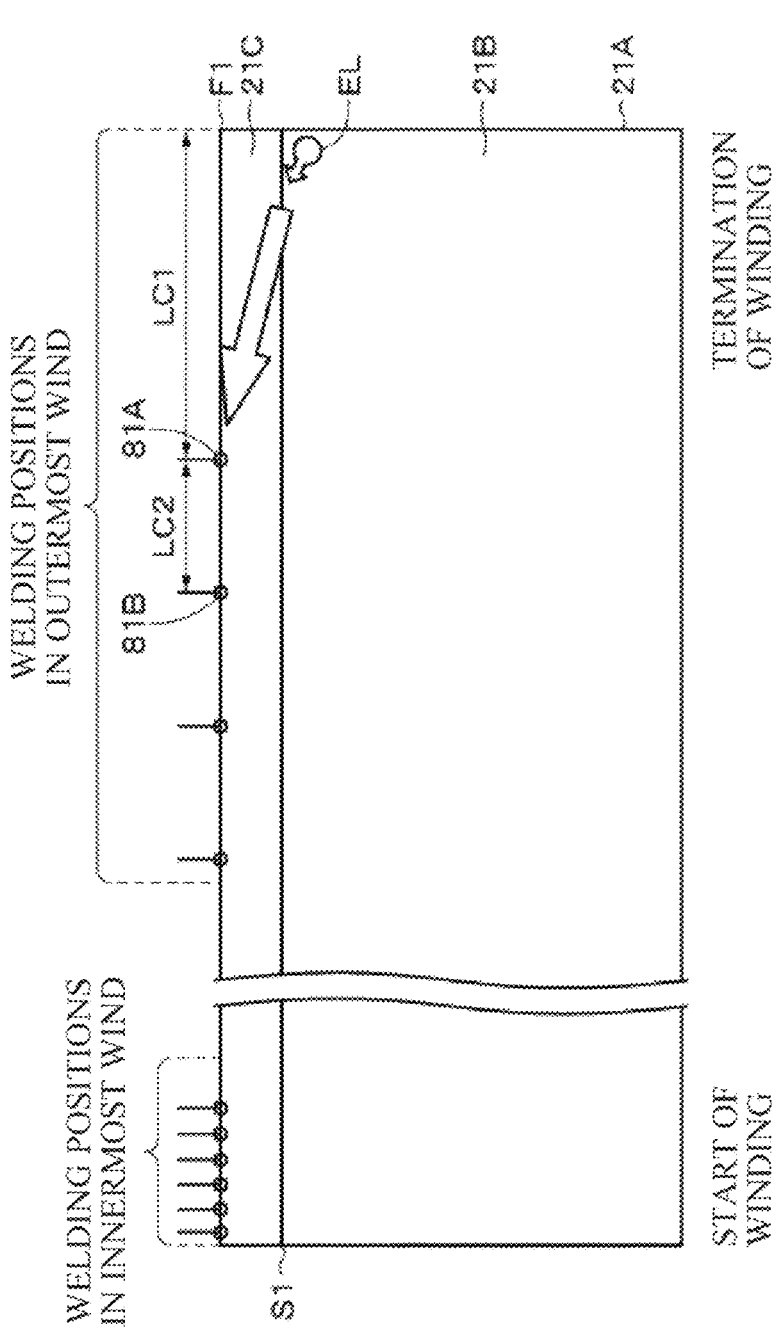
FIG. 12 is a diagram for describing a reason for a decrease in current collection efficiency.
Figure 13:
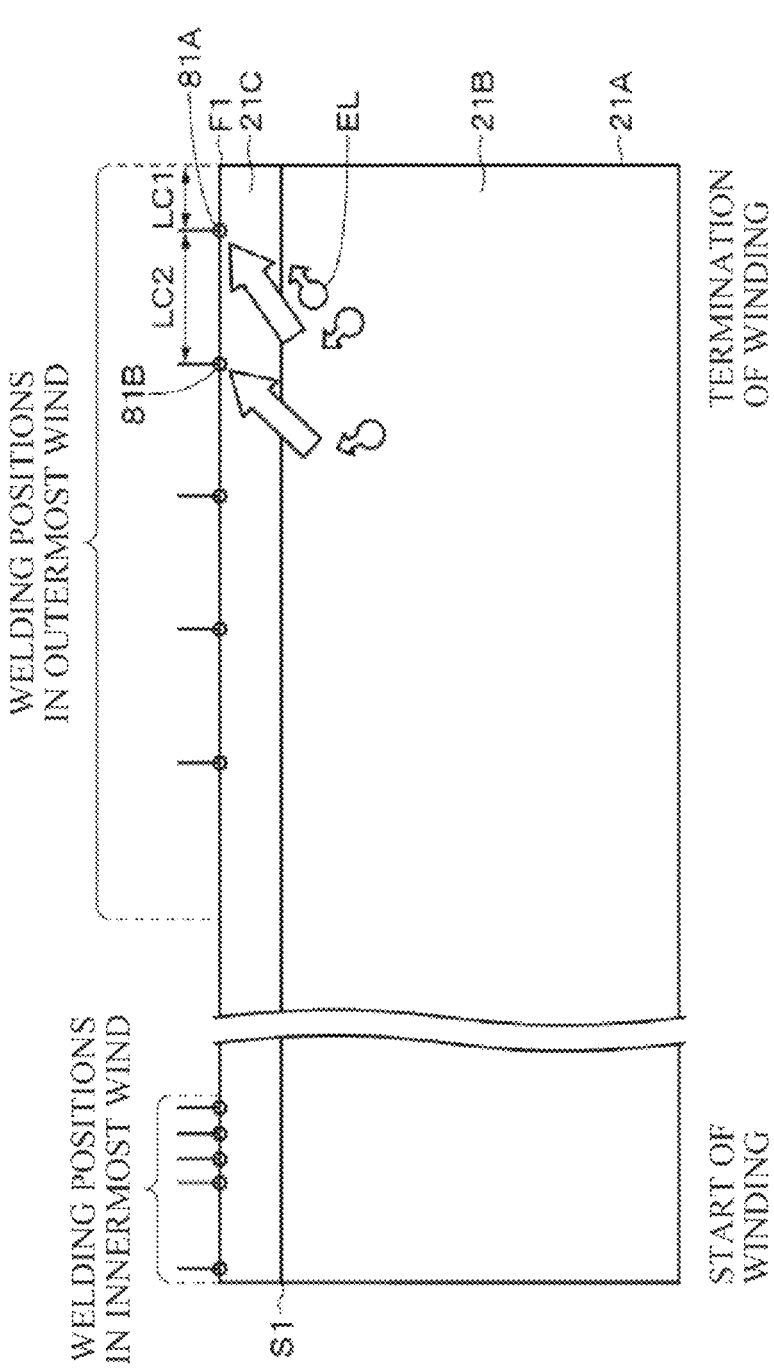
FIG. 13 is a diagram for describing a reason for an increase in current collection efficiency.

FIG. 12 is a diagram in which the positive electrode 21 after undergoing laser welding is virtually developed, and corresponds to FIG. 10, views A and B. FIG. 13 is a diagram in which the positive electrode 21 after undergoing laser welding is virtually developed, and corresponds to FIG. 11, views A and B. As schematically illustrated in FIG. 12, the first weld 81A is far from the winding termination end F1. This increases a distance (indicated by an arrow) over which electrons EL are extracted, resulting in lower current collection efficiency. To address this, the first weld 81A may be provided at a position near to the winding termination end F1, as schematically illustrated in FIG. 13. In this case, owing to the first weld 81A being near to the winding termination end F1, the distance (indicated by an arrow) over which the electrons EL are extracted decreases, and accordingly, the current collection efficiency improves.

Note that as described above, the first weld 81A and the second weld 81B are formed on the flat surface 71. To facilitate understanding, the description has been given of FIGS. 10 to 13 with reference to a state before formation of the flat surface 71. Among welds formed on the flat surface 71, a weld that is nearest to the winding termination end F1 as viewed along the direction opposite to the winding direction corresponds to the first weld 81A, and a weld that is second nearest to the winding termination end F1 after the weld 81A as viewed along the above-described direction corresponds to the second weld 81B.

Figure 14:
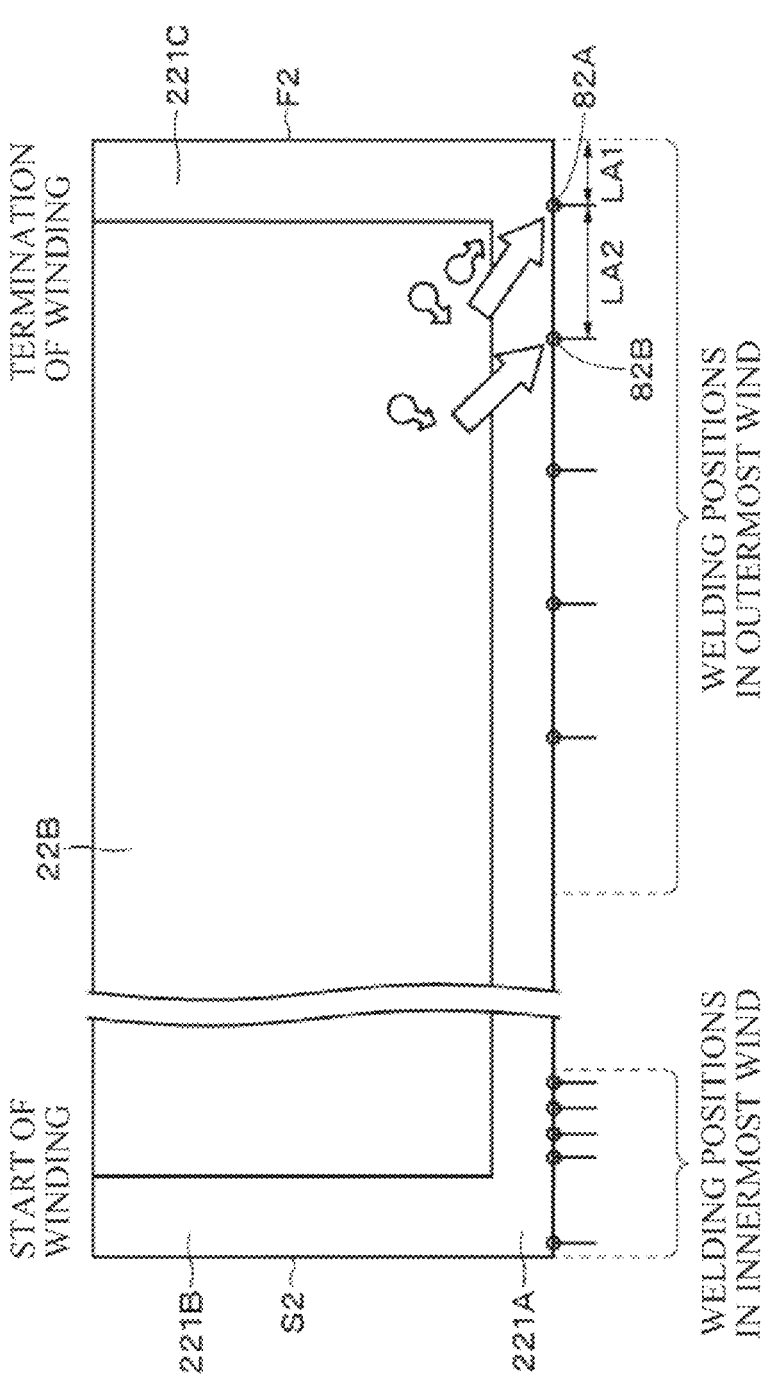
FIG. 14 is a diagram for describing the reason for the increase in current collection efficiency.

A similar description applies to the negative electrode 22. That is, as illustrated in FIG. 14, a winding start end of the negative electrode 22 is denoted as S2, and a winding termination end of the negative electrode 22 is denoted as F2. As viewed along the direction opposite to the winding direction from the winding termination end F2 as the starting point, a weld that is nearest to the winding termination end F2 will be referred to as a third weld 82A as appropriate, and a weld that is second nearest to the winding termination end F2 after the weld 82A will be referred to as a fourth weld 82B as appropriate. In this case also, as with the positive electrode 21, it is possible to improve the current collection efficiency of the lithium ion battery 1 by bringing a position of the third weld 82A near to the winding termination end F2 to the extent that welding is possible.

Note that in the following description, a distance from the winding termination end F2 to the third weld 82A will be referred to as LA1 (in millimeters) as appropriate. A distance from the third weld 82A to the fourth weld 82B will be referred to as LA2 (in millimeters) as appropriate.

The lithium ion battery 1 according to the present embodiment satisfies Expressions (1) and (2) below:

$$0 \leq LC1 \leq LC2 \qquad (1)$$

$$0 \leq LA1 \leq LA2 \qquad (2).$$

An upper limit of each of LC1 and LA1 is preferably 0.38 D and an upper limit of each of LC2 and LA2 is preferably 0.75 D, where D represents a diameter (an outer shape) of the lithium ion battery 1 in millimeters. The diameter of the lithium ion battery 1 is, for example, a diameter of the bottom surface of the battery can 11, i.e., a surface of a negative electrode terminal. A length 0.38 D corresponds to approximately ⅛ of a length of a peripheral surface of the electrode wound body 20. When LC1 and LA1 are each less than or equal to 0.38 D, relatively high current collection efficiency is achievable and accordingly, it is possible to provide the lithium ion battery 1 that is low in resistance. Further, a length 0.75 D corresponds to approximately ¼ of the length of the peripheral surface of the electrode wound body 20. When LC2 and LA2 are each less than or equal to 0.75 D, relatively high current collection efficiency is achievable and accordingly, it is possible to provide the lithium ion battery 1 that is low in resistance.

Next, a method of fabricating the lithium ion battery 1 according to the present embodiment will be described with reference to FIG. 15, views A to F. First, the positive electrode active material was applied on the surface of the positive electrode foil 21A having a band shape to thereby form the positive electrode active material covered part 21B, and the negative electrode active material was applied on the surface of the negative electrode foil 22A having a band shape to thereby form the negative electrode active material covered part 22B. At this time, the positive electrode active material uncovered part 21C without the positive electrode active material applied thereon was provided on one end side in the width direction of the positive electrode foil 21A, and the negative electrode foil 22A was provided with the negative electrode active material uncovered part 22C (including the first negative electrode active material uncovered part 221A, the second negative electrode active material uncovered part 221B, and the third negative electrode active material uncovered part 221C) without the negative electrode active material applied thereon. Thereafter, the positive electrode 21 and the negative electrode 22 were subjected to processes including a drying process. Thereafter, the positive electrode 21 and the negative electrode 22 were laid over each other with the separator 23 interposed therebetween in such a manner that the positive electrode active material uncovered part 21C and the negative electrode active material uncovered part 22C faced toward opposite directions, and they were wound in a spiral shape to allow the through hole 26 to develop on the central axis. Thus, the electrode wound body 20 as illustrated in FIG. 15, view A was fabricated.

Figure 15:
FIG. 15 includes views A to F that are diagrams describing a process of assembling the lithium ion battery according to an embodiment.
Figure 15:
Figure 15:
Figure 15:
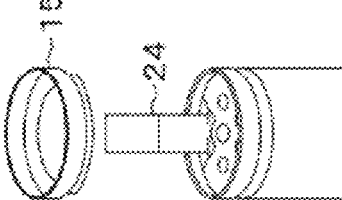
Figure 15:
Figure 15:
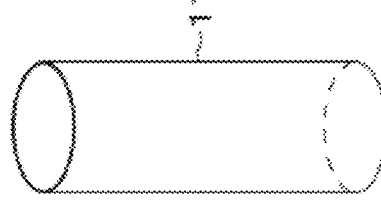
Figure 15:
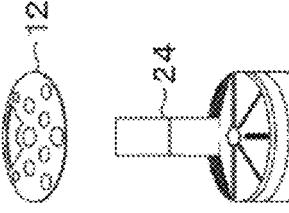
Figure 15:
Figure 15:
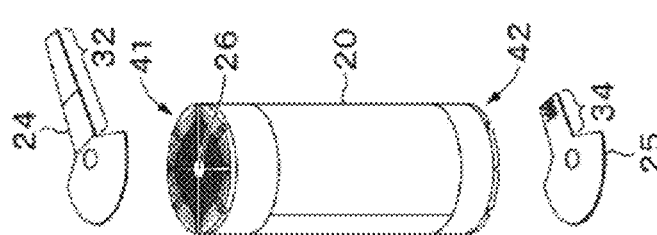
Figure 15:
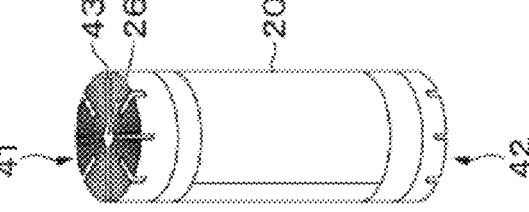
Figure 15:
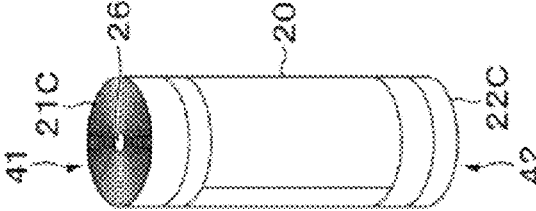

Thereafter, grooves 43 were formed (produced) as illustrated in FIG. 15, view B, using an unillustrated groove forming jig provided with a member such as a flat plate at an end face thereof. Specifically, the member such as the flat plate of the groove forming jig was pressed perpendicularly against each of the end faces 41 and 42 to thereby produce the grooves 43 in a portion of each of the end faces 41 and 42. By this method, the grooves 43 were produced to extend radially from the through hole 26. For example, the grooves 43 extend from an outer edge part 27 of the end face 41 to the through hole 26, or from an outer edge part 28 of the end face 42 to the through hole 26. Note that the number and arrangement of the grooves 43 illustrated in FIG. 15, view B are merely one example, and the illustrated example is thus non-limiting.

Thereafter, using an unillustrated flat surface forming jig, the flat surfaces 71 and 72 were formed as in FIG. 15, view C (a flat surface forming process). Specifically, respective flat end faces of the flat surface forming jigs were pressed substantially perpendicularly against the end faces 41 and 42 with equal pressures from both electrode sides simultaneously to thereby apply loads thereto. In such a manner, portions of the positive electrode active material uncovered part 21C were caused to overlap with each other toward the central axis to thereby make the end face 41 into the flat surface 71, and portions of the negative electrode active material uncovered part 22C (more specifically, portions of the first negative electrode active material uncovered part 221A) were caused to overlap with each other toward the central axis to thereby make the end face 42 into the flat surface 72. The flat surfaces 71 and 72 each have the grooves 43 formed in a groove forming process. Thereafter, the fan-shaped part 31 of the positive electrode current collector plate 24 was coupled to the flat surface 71 by laser welding, and the fan-shaped part 33 of the negative electrode current collector plate 25 was coupled to the flat surface 72 by laser welding.

Thereafter, as illustrated in FIG. 15, view D, the band-shaped part 32 of the positive electrode current collector plate 24 and the band-shaped part 34 of the negative electrode current collector plate 25 were bent, the insulator 12 was attached to the positive electrode current collector plate 24, and the insulator 13 was attached to the negative electrode current collector plate 25. The electrode wound body 20 having been assembled in the above-described manner was placed into the battery can 11 illustrated in FIG. 15, view E. Thereafter, the negative electrode current collector plate 25 was welded to the bottom of the battery can 11 by pressing the unillustrated welding rod thereagainst. The electrolytic solution was injected into the battery can 11, following which the battery can 11 was sealed with the gasket 15 and the battery cover 14, as illustrated in FIG. 15, view F. The lithium ion battery 1 was fabricated as described above.

Note that the insulators 12 and 13 may each be an insulating tape. Further, a method of coupling may be other than laser welding. The grooves 43 remain in the flat surfaces even after the portions of each of the positive electrode active material uncovered part 21C and the first negative electrode active material uncovered part 221A are bent, and a portion of each of the flat surfaces without the grooves 43 is coupled to the positive electrode current collector plate 24 or the negative electrode current collector plate 25; however, the grooves 43 may be coupled to a portion of the positive electrode current collector plate 24 or a portion of the negative electrode current collector plate 25.

The present embodiment makes it possible to achieve the following effects, for example, according to an embodiment.

By providing the welds at respective positions near to the winding termination end F1 of the positive electrode 21 and the winding termination end F2 of the negative electrode 22, it is possible to improve current collection efficiency. Accordingly, it is possible to provide a lithium ion battery that is low in internal resistance and superior in high output power characteristic.

During fabrication of the lithium ion battery, the negative electrode active material can sometimes peel off the negative electrode active material covered part 22B on a winding start side of the electrode wound body 20, i.e., an end side in the longitudinal direction of the negative electrode located in an innermost wind of the electrode wound body 20, when an edge of a thin flat plate or the like (having a thickness of 0.5 mm, for example) is pressed perpendicularly against each of the end faces 41 and 42, that is, when the process illustrated in FIG. 15, view B is performed. A possible cause of the peeling is stress generated upon pressing the above-de-scribed flat plate against the end face 42. The negative electrode active material having peeled off can enter the inside of the electrode wound body 20 and can thereby cause an internal short circuit in the lithium ion battery 1. According to the present embodiment, the provision of the second negative electrode active material uncovered part 221B helps to prevent the peeling of the negative electrode active material, thereby helping to prevent the occurrence of the internal short circuit.

On a winding termination side of the electrode wound body 20, the negative electrode 22 may have a region of the negative electrode active material uncovered part 22C at a major surface facing away from the positive electrode active material covered part 21B. A reason for this is that even if the negative electrode active material covered part 22B is present at the major surface facing away from the positive electrode active material covered part 21B, its contribution to charging and discharging is considered to be low. The region of the negative electrode active material uncovered part 22C preferably falls within a range from ¾ winds to 5⁄4 winds, both inclusive, of the electrode wound body 20. In this case, owing to the absence of the negative electrode active material covered part 22B that is low in contribution to charging and discharging, it is possible to make an initial capacity higher with respect to the same volume of the electrode wound body 20.

According to the present embodiment, in the electrode wound body 20, the positive electrode 21 and the negative electrode 22 are laid over each other and wound in such a manner that the positive electrode active material uncovered part 21C and the first negative electrode active material uncovered part 221A face toward opposite directions. Thus, the positive electrode active material uncovered part 21C is localized to the end face 41, and the first negative electrode active material uncovered part 221A is localized to the end face 42 of the electrode wound body 20. The positive electrode active material uncovered part 21C and the first negative electrode active material uncovered part 221A are bent to make the end faces 41 and 42 into the flat surfaces 71 and 72, respectively. The direction of bending is from the outer edge part 27 of the end face 41 toward the central axis, or from the outer edge part 28 of the end face 42 toward the central axis. Portions of the active material uncovered part that are located in adjacent winds in a wound state overlap with each other. By making the end face 41 into the flat surface 71, it is possible to achieve better contact between the positive electrode active material uncovered part 21C and the positive electrode current collector plate 24. By making the end face 42 into the flat surface 72, it is possible to achieve better contact between the first negative electrode active material uncovered part 221A and the negative electrode current collector plate 25. Further, by making the end faces 41 and 42 into the flat surfaces 71 and 72, respectively, it is possible to achieve reduced resistance of the lithium ion battery 1.

It may seem to be possible to make the end faces 41 and 42 into the flat surfaces by bending the positive electrode active material uncovered part 21C and the first negative electrode active material uncovered part 221A. However, without any processing in advance of bending, creases or voids (gaps or spaces) can develop in the end faces 41 and 42, thus making it difficult for the end faces 41 and 42 to be flat surfaces. Here, "creases" and "voids" are unevenness that can develop in the positive electrode active material uncovered part 21C and the first negative electrode active material uncovered part 221A having been bent, resulting in non-flat portions of the end faces 41 and 42. In the present embodiment, the grooves 43 are formed in advance in radial directions from the through hole 26 on each of the end face 41 side and the end face 42 side. The presence of the grooves 43 helps to prevent the creases and voids from developing, and thereby helps to achieve increased flatness of the end faces 41 and 42. Note that although either the positive electrode active material uncovered part 21C or the first negative electrode active material uncovered part 221A may be bent, it is preferable that both be bent.

EXAMPLE

In the following, the lithium ion batteries fabricated in the above-described manner were used to measure an alternat-ing-current resistance ACR (mΩ), a direct-current resistance DCR (mΩ), and a load discharge rate (%) while varying LC1, LC2, LA1, and LA2 in magnitude. The present application will be described in further detail including with reference to Example according to an embodiment and comparative examples. Note that the present application is not limited to Example described below.

For each of Example and the comparative examples described below, a battery size was set to 18650 (18 mm in diameter and 65 mm in height), and a cylindrical shape was selected as a battery shape. An Al alloy was selected as the material of the positive electrode current collector plate 24. A Cu alloy was selected as the material of the negative electrode current collector plate 25. The length D5 of the positive electrode active material uncovered part 21C in the width direction was set to 7 (mm). The length D6 of the first negative electrode active material uncovered part 221A in the width direction was set to 4 (mm). The length D7, in the width direction, of the portion of the positive electrode active material uncovered part 21C protruding from the separator 23 was set to 4.5 (mm). The length D8, in the width direction, of the portion of the first negative electrode active material uncovered part 221A protruding from the separator 23 was set to 3 (mm).

The separator 23 was placed to cover all of regions of the positive electrode active material covered part 21B and the negative electrode active material covered part 22B. The number of the grooves 43 was set to eight, and the eight grooves 43 were arranged at substantially equal angular intervals.

Example 1

The lithium ion battery 1 was fabricated through the above-described process. In fabricating the lithium ion battery 1, the first weld 81A and the second weld 81B were provided to satisfy $0 \leq LC1 \leq LC2$, and the third weld 82A and the fourth weld 82B were provided to satisfy $0 \leq LA1 \leq LA2$.

Comparative Example 1

The first weld 81A and the second weld 81B were provided to cause LC1 and LC2 to satisfy a relationship $LC2 < LC1$, and the third weld 82A and the fourth weld 82B were provided to cause LA1 and LA2 to satisfy a relationship $LA2 < LA1$. The lithium ion battery was fabricated otherwise in a similar manner to that in Example 1.

Comparative Example 2

In Comparative example 2, the first weld 81A and the second weld 81B were provided to satisfy $0 \leq LC1 \leq LC2$, and the third weld 82A and the fourth weld 82B were provided not to satisfy $0 \leq LA1 \leq LA2$, in other words, to satisfy $LA2 < LA1$. The lithium ion battery was fabricated otherwise in a similar manner to that in Example 1.

Comparative Example 3

In Comparative example 3, the first weld 81A and the second weld 81B were provided not to satisfy $0 \leq LC1 \leq LC2$, in other words, to satisfy $LC2 < LC1$, and the third weld 82A and the fourth weld 82B were provided to satisfy $0 \leq LA1 \leq LA2$. The lithium ion battery was fabricated otherwise in a similar manner to that in Example 1.

[Evaluation]

The batteries of Example 1 and Comparative examples 1 to 3 were subjected to measurements of the alternating-current resistance ACR (mΩ), the direct-current resistance DCR (mΩ), and the load discharge rate (%).

For the alternating-current resistance ACR, a resistance value (mΩ) at an alternating current of 1 kHz was measured.

The direct-current resistance DCR (mΩ) was obtained by calculating a gradient of voltage when a discharge current was increased from 0 (A) to 100 (A) in five seconds.

The load discharge rate (%) was obtained by: performing charging with a constant current of 2 (A) for 3.5 hours; thereafter performing discharging with a current value of 40 (A) and a cutoff voltage of 2.0 (V), and at a temperature of 23° C.; and dividing a discharge capacity (mAh) upon discharging until a surface temperature of the battery reached 75° C. by a charge capacity (mAh).

For each of the above measurements, an average value was calculated from measurement values of ten lithium ion batteries.

The results are given in Table 1 below.

TABLE 1

| Battery size: 18650 (18 mm in diameter, 65 mm in length, cylindrical shape) | | | | | | | |
| --- | --- | --- | --- | --- | --- | --- | --- |
| | ACR [mΩ] | 100 A DCR [mΩ] | 40 A Load discharge rate [%] | LC1 [mm] | LC2 [mm] | LA1 [mm] | LA2 [mm] |
| Example 1 | 4 | 10.5 | 80 | 2.4 | 4.8 | 2.5 | 4.9 |
| Comparative example 1 | 4 | 11.3 | 76 | 14.4 | 4.8 | 14.7 | 4.9 |
| Comparative example 2 | 4 | 10.9 | 78 | 2.4 | 4.8 | 14.7 | 4.9 |
| Comparative example 3 | 4 | 11.1 | 77 | 14.4 | 4.8 | 2.5 | 4.9 |

The alternating-current resistance ACR was 4 mΩ for all of Example 1 and Comparative examples 1 to 3. The direct-current resistance DCR was 10.5 mΩ for Example 1, 11.3 mΩ for Comparative example 1, 10.9 mΩ for Comparative example 2, and 11.1 mΩ for Comparative example 3, thus being lowest for Example 1. The load discharge rate was 80% for Example 1, 76% for Comparative example 1, 78% for Comparative example 2, and 77% for Comparative example 3, thus being highest for Example 1. The results presented in Table 1 indicate that Example 1 which satisfies Expressions (1) and (2) described above is able to provide a battery that is improved in current collection efficiency, lower in internal resistance, and superior in high output power characteristic or high rate characteristic.

Although one or more embodiments of the present application have been described herein, the contents of the present application are not limited thereto, and various modifications may be made according to an embodiment.

Figure 16:
FIG. 16 includes views A and B that are diagrams for describing a modification example.
Figure 16:
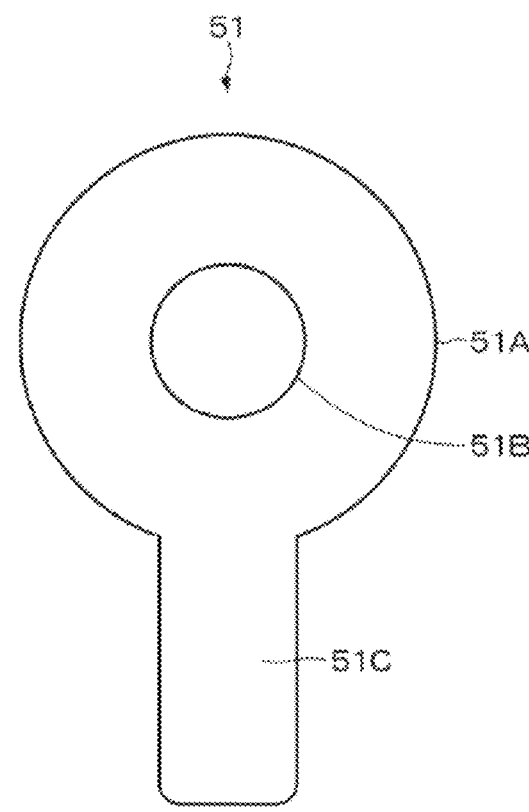
Figure 16:
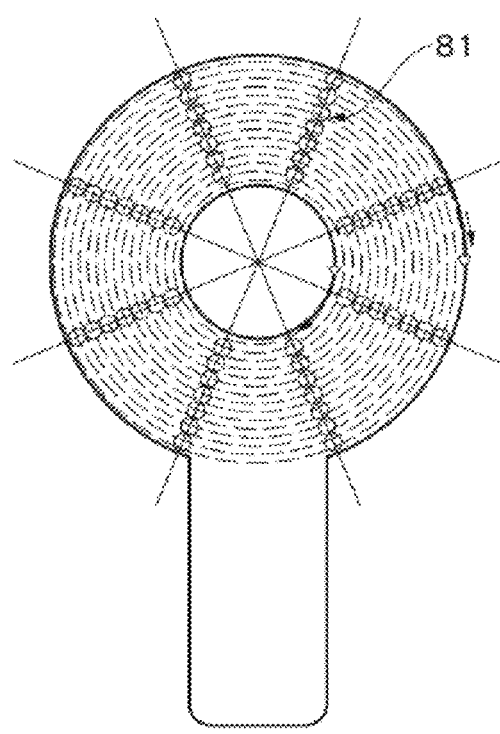
Figure 17:
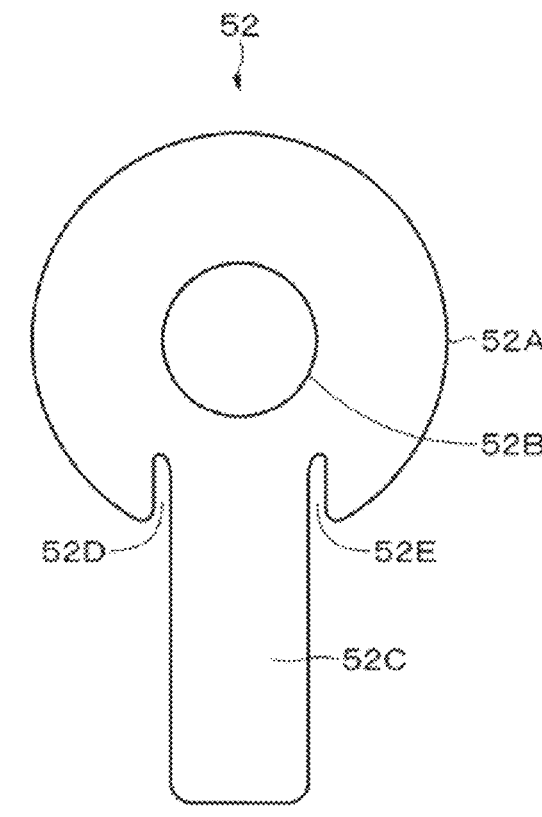
FIG. 17 includes views A and B that are diagrams for describing a modification example.
Figure 17:
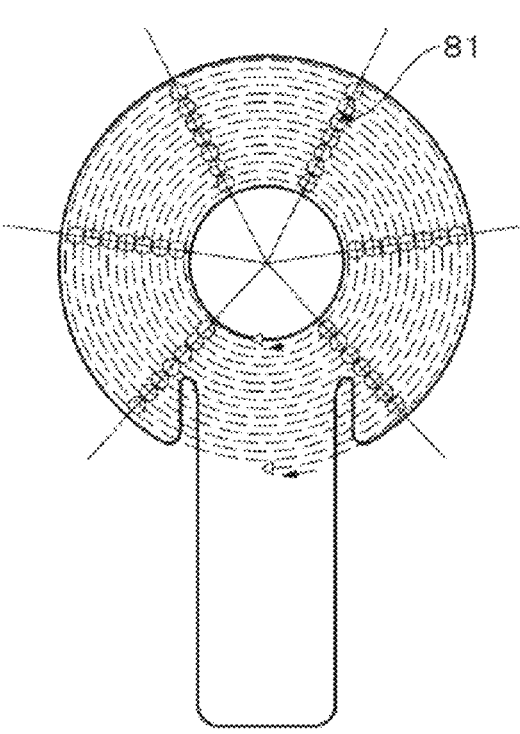

The shapes of the positive electrode current collector plate 24 and the negative electrode current collector plate 25 may be changed as appropriate, and the numbers of the weld groups 81 and 82 may also be changed in accordance with the respective shapes of the positive electrode current collector plate 24 and the negative electrode current collector plate 25. For example, as illustrated in FIG. 16, view A, the positive electrode current collector plate 24 may be replaced with a positive electrode current collector plate 51. The positive electrode current collector plate 51 includes a base part 51A having a substantially circular shape, and a band-shaped part 51C extending outward from a portion of an outer edge of the base part 51A. The base part 51A has a hole 51B in a middle thereof. When the positive electrode current collector plate is shaped to be the positive electrode current collector plate 51, eight weld groups 81 are formed radially as illustrated in FIG. 16, view B, for example. Alternatively, as illustrated in FIG. 17, view A, the positive electrode current collector plate 24 may be replaced with a positive electrode current collector plate 52. The positive electrode current collector plate 52 includes a base part 52A having a substantially circular shape, and a band-shaped part 52C extending outward from a portion of an outer edge of the base part 52A. The base part 52A has a hole 52B in a middle thereof. Cutouts 52D and 52E extending inward are formed at two positions between the base part 52A and the band-shaped part 52C. When the positive electrode current collector plate is shaped to be the positive electrode current collector plate 52, six weld groups 81 are formed radially as illustrated in FIG. 17, view B, for example. The above-described modification examples are applicable also to the negative electrode current collector plate 25.

The laser welding may be performed by intermittent irradiation with the laser light. The shape of the weld group and the number of welds constituting the weld group, for example, may be changed as appropriate.

In the above-described embodiment, a configuration including the second negative electrode active material uncovered part 221B and the third negative electrode active material uncovered part 221C is preferable; however, the present application is also applicable to a lithium ion battery without these parts.

Although the number of the grooves 43 was set to eight in the above-described Example and comparative examples, any other number of grooves 43 may be provided. Although a configuration having the grooves 43 is preferable, the present application is also applicable to a battery without the grooves 43. The battery size may be any size other than 21700 (21 mm in diameter and 70 mm in height) or 18650 (18 mm in diameter and 65 mm in height).

The fan-shaped parts 31 and 33 according to the above-described embodiment may each have a shape other than the fan shape.

The present application is applicable to any suitable battery including the lithium ion battery, and to any suitable battery having a cylindrical shape or any other shape, such as a laminated battery, a prismatic battery, a coin-type battery, or a button-type battery, without departing from the scope of the present application. In such a case, the shape of the "end face of the electrode wound body" is not limited to a circular shape, and may be any of other shapes including, without limitation, a rectangular shape, an elliptical shape, and an elongated shape. Further, the present application is implementable also as a method of manufacturing a battery according to an embodiment.

Figure 18:
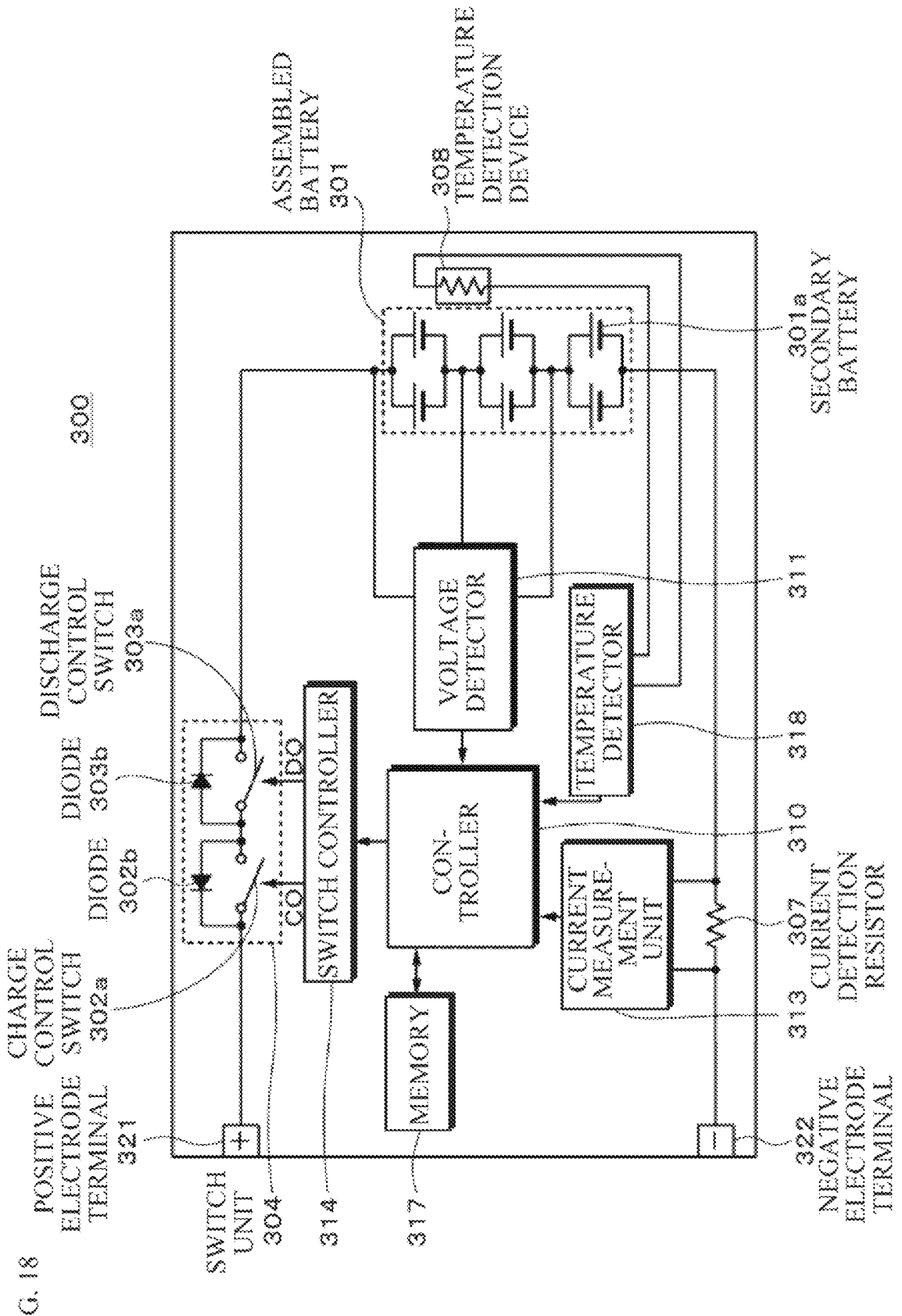
FIG. 18 is a coupling diagram for use to describe a battery pack as an application example.

FIG. 18 is a block diagram illustrating a circuit configuration example where the secondary battery according to an embodiment is applied to a battery pack 300. The battery pack 300 includes an assembled battery 301, a switch unit 304, a current detection resistor 307, a temperature detection device 308, and a controller 310. The switch unit 304 includes a charge control switch 302a and a discharge control switch 303a. The controller 310 controls each device. Further, the controller 310 is able to perform charge and discharge control upon abnormal heat generation, and to perform calculation and correction of a remaining capacity of the battery pack 300. The battery pack 300 includes a positive electrode terminal 321 and a negative electrode terminal 322 that are couplable to a charger or electronic equipment for charging and discharging.

The assembled battery 301 includes multiple secondary batteries 301a coupled in series or in parallel. FIG. 18 illustrates an example case in which six secondary batteries 301a are coupled in a two parallel coupling and three series coupling (2P3S) configuration. The secondary battery according to an embodiment is applicable to the secondary battery 301a.

A temperature detector 318 is coupled to the temperature detection device 308 (for example, a thermistor). The temperature detector 318 measures a temperature of the assembled battery 301 or the battery pack 300, and supplies the measured temperature to the controller 310. A voltage detector 311 measures a voltage of the assembled battery 301 and a voltage of each of the secondary batteries 301a included therein, performs A/D conversion on the measured voltages, and supplies the converted voltages to the controller 310. A current measurement unit 313 measures currents using the current detection resistor 307, and supplies the measured currents to the controller 310.

A switch controller 314 controls the charge control switch 302a and the discharge control switch 303a of the switch unit 304 based on the voltages and the currents respectively supplied from the voltage detector 311 and the current measurement unit 313. When the voltage of any of the secondary batteries 301a becomes higher than or equal to an overcharge detection voltage or becomes lower than or equal to an overdischarge detection voltage, the switch controller 314 transmits a turn-off control signal to the switch unit 304 to thereby prevent overcharging or overdischarging. The overcharge detection voltage is, for example, 4.20 V±0.05 V. The overdischarge detection voltage is, for example, 2.4 V±0.1 V.

After the charge control switch 302a or the discharge control switch 303a is turned off, charging or discharging is enabled only through a diode 302b or a diode 303b. Semiconductor switches such as MOSFETs are employable as these charge and discharge control switches. Note that although the switch unit 304 is provided on a positive side in FIG. 18, the switch unit 304 may be provided on a negative side.

A memory 317 includes a RAM and a ROM. Numerical values including, for example, battery characteristic values, a full charge capacity, and a remaining capacity calculated by the controller 310 are stored and rewritten therein.

The secondary battery according to an embodiment described herein is mountable on equipment such as electronic equipment, electric transport equipment, or a power storage apparatus, and is usable to supply electric power.

Examples of the electronic equipment include laptop personal computers, smartphones, tablet terminals, personal digital assistants (PDAs) (mobile information terminals), mobile phones, wearable terminals, digital still cameras, electronic books, music players, game machines, hearing aids, electric tools, televisions, lighting equipment, toys, medical equipment, and robots. In addition, for example, electric transport equipment, power storage apparatuses, and aerial vehicles such as electric unmanned aerial vehicles, which will be described later, may also be included in the electronic equipment in a broad sense.

Examples of the electric transport equipment include electric automobiles (including hybrid electric automobiles), electric motorcycles, electric-assisted bicycles, electric buses, electric carts, automated guided vehicles (AGVs), and railway vehicles. Examples of the electric transport equipment further include electric passenger aircrafts and electric unmanned aerial vehicles for transportation. The secondary battery according to the present application is used not only as a driving power source for the foregoing electric transport equipment but also as, for example, an auxiliary power source or an energy-regenerative power source therefor.

Examples of the power storage apparatuses include a power storage module for commercial or household use, and a power storage power source for architectural structures including residential houses, buildings, and offices, or for power generation facilities.

Figure 19:
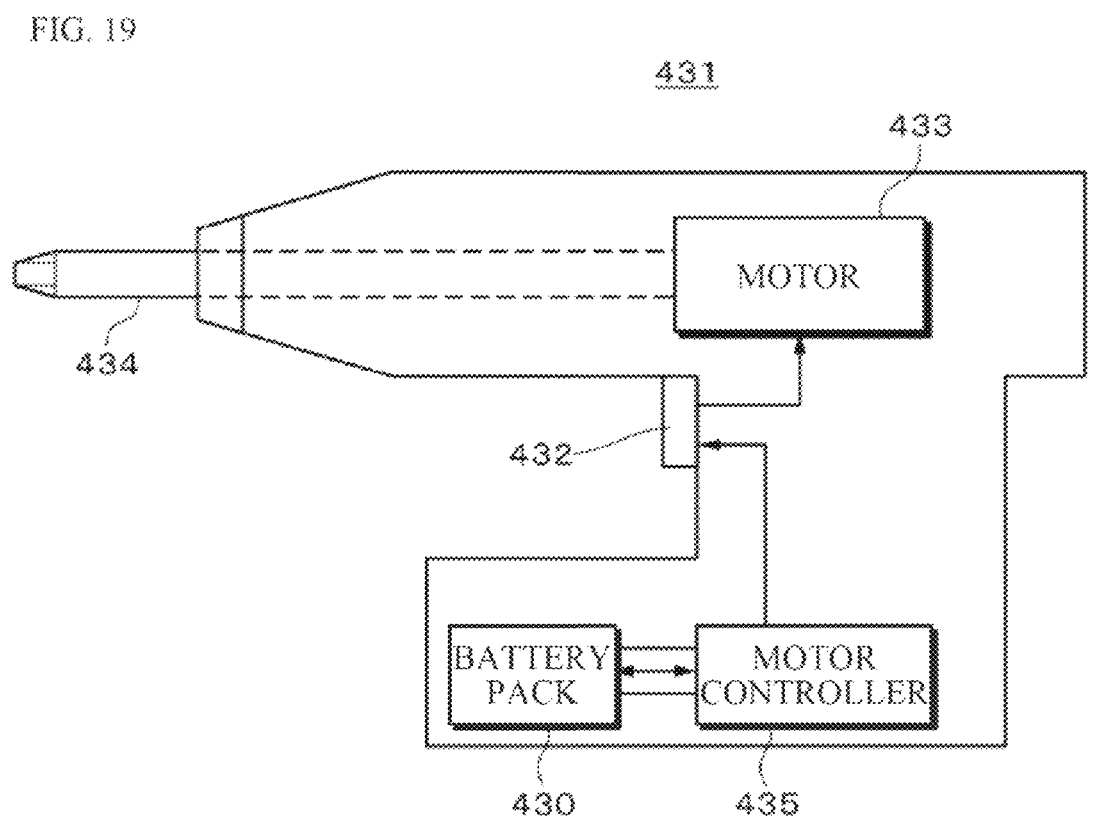

As an example of the electric tools to which the present application is applicable, an electric screwdriver will be schematically described with reference to FIG. 19. An electric screwdriver 431 includes a motor 433 and a trigger switch 432. The motor 433 transmits rotational power to a shaft 434. The trigger switch 432 is operated by a user. A battery pack 430 and a motor controller 435 are contained in a lower housing of a handle of the electric screwdriver 431. The battery pack 430 is built in or detachably attached to the electric screwdriver 431. The secondary battery according to an embodiment is applicable to a battery included in the battery pack 430.

The battery pack 430 and the motor controller 435 may include respective microcomputers (not illustrated) communicable with each other to transmit and receive charge and discharge data on the battery pack 430. The motor controller 435 controls operation of the motor 433, and is able to cut off power supply to the motor 433 under abnormal conditions such as overdischarging.

Figure 20:
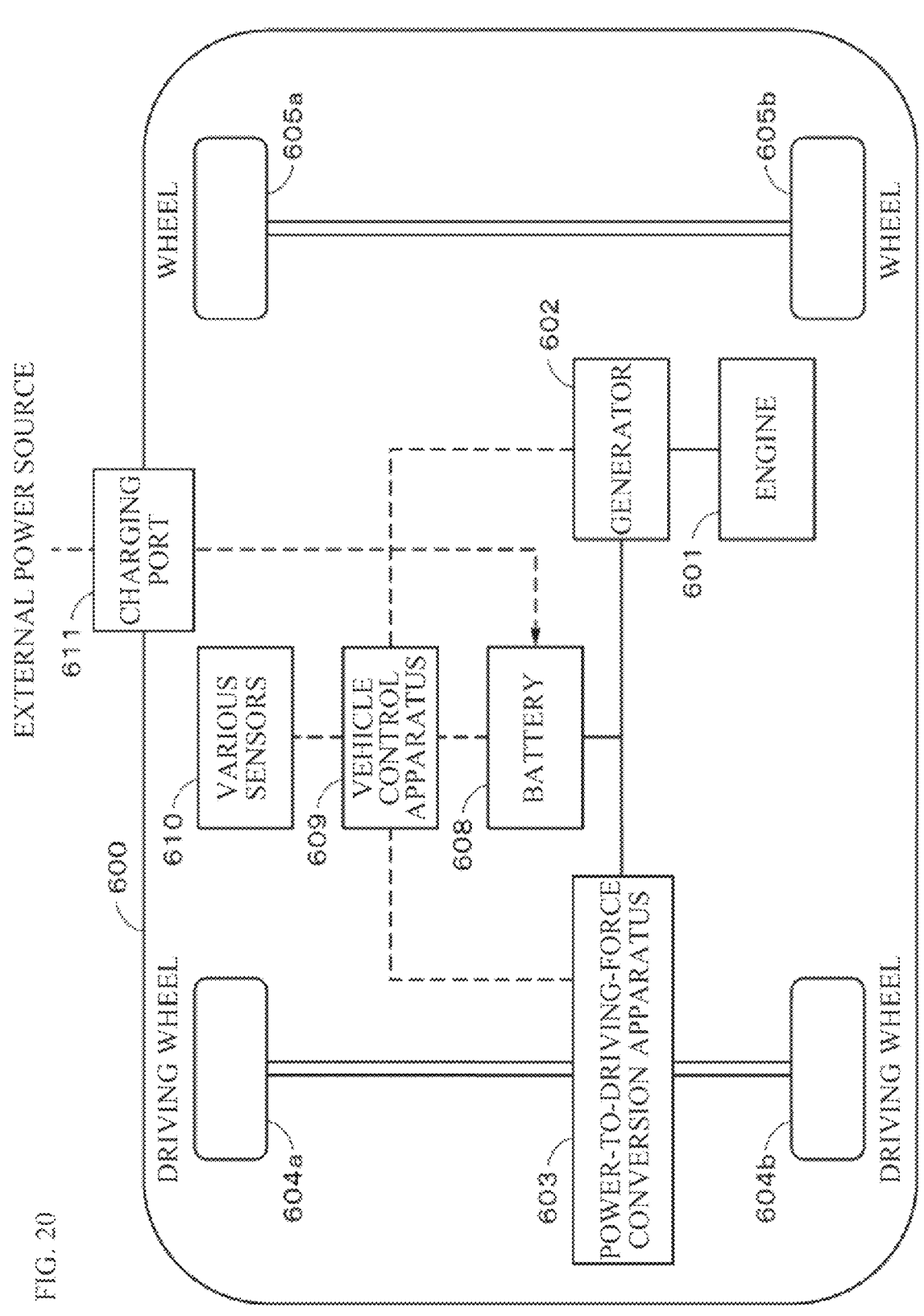
FIG. 20 is a coupling diagram for use to describe an electric vehicle as an application example.

As an example of application of an embodiment of the present application to a power storage system for electric vehicles, FIG. 20 schematically illustrates a configuration example of a hybrid vehicle (HV) that employs a series hybrid system. The series hybrid system relates to a vehicle that travels with an electric-power-to-driving-force conversion apparatus, using electric power generated by a generator that uses an engine as a power source, or using electric power temporarily stored in a battery.

A hybrid vehicle 600 is equipped with an engine 601, a generator 602, an electric-power-to-driving-force conversion apparatus (a direct-current motor or an alternating-current motor; hereinafter, simply "motor 603"), a driving wheel 604a, a driving wheel 604b, a wheel 605a, a wheel 605b, a battery 608, a vehicle control apparatus 609, various sensors 610, and a charging port 611. The secondary battery according to an embodiment, or a power storage module equipped with a plurality of secondary batteries according to an embodiment is applicable to the battery 608.

The motor 603 operates under the electric power of the battery 608, and a rotational force of the motor 603 is transmitted to the driving wheels 604a and 604b. Electric power generated by the generator 602 using a rotational force generated by the engine 601 is storable in the battery 608. The various sensors 610 control an engine speed via the vehicle control apparatus 609, and control an opening angle of an unillustrated throttle valve.

When the hybrid vehicle 600 is decelerated by an unillustrated brake mechanism, a resistance force at the time of deceleration is applied to the motor 603 as a rotational force, and regenerative electric power generated from the rotational force is stored in the battery 608. In addition, the battery 608 is chargeable by being coupled to an external power source via the charging port 611 of the hybrid vehicle 600. Such an HV vehicle is referred to as a plug-in hybrid vehicle (PHV or PHEV).

Note that the secondary battery according to an embodiment may be applied to a small-sized primary battery and used as a power source of an air pressure sensor system (a tire pressure monitoring system: TPMS) built in the wheels 604 and 605.

Although the series hybrid vehicle has been described above as an example, an embodiment of the present application is applicable also to a hybrid vehicle of a parallel system in which an engine and a motor are used in combination, or of a combination of the series system and the parallel system. Furthermore, an embodiment of the present application is applicable to an electric vehicle (EV or BEV) and a fuel cell vehicle (FCV) that travel by means of only a driving motor without using an engine.

REFERENCE SIGNS LIST

1: lithium ion battery
12, 13: insulator
21: positive electrode
21A: positive electrode foil
21B: positive electrode active material layer
21C: positive electrode active material uncovered part
22: negative electrode
22A: negative electrode foil
22B: negative electrode active material layer
22C: negative electrode active material uncovered part
23: separator
24: positive electrode current collector plate
25: negative electrode current collector plate
26: through hole
31, 33: fan-shaped part
32, 34: band-shaped part
41, 42: end face
43: groove
71, 72: flat surface
81, 82: weld group
81A: first weld
81B: second weld
82A: third weld
82B: fourth weld
221A: first negative electrode active material uncovered part It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an electrode wound body including a positive electrode having a band shape and a negative electrode having a band shape, the positive electrode and the negative electrode being stacked with a separator interposed therebetween;
a positive electrode current collector plate;
a negative electrode current collector plate; and
a battery can containing the electrode wound body, the positive electrode current collector plate, and the negative electrode current collector plate, wherein
the positive electrode includes, on a positive electrode foil having a band shape, a positive electrode active material covered part covered with a positive electrode active material layer, and a positive electrode active material uncovered part,
the negative electrode includes, on a negative electrode foil having a band shape, a negative electrode active material covered part covered with a negative electrode active material layer, and a negative electrode active material uncovered part extending in a longitudinal direction of the negative electrode foil,
the positive electrode active material uncovered part is welded to the positive electrode current collector plate at one of end faces of the electrode wound body,
the negative electrode active material uncovered part is welded to the negative electrode current collector plate at another of the end faces of the electrode wound body, the positive electrode current collector plate and the negative electrode current collector plate each include weld groups that are provided radially, the positive electrode active material uncovered part includes a first weld that is nearest to a winding termination end of the positive electrode foil, and a second weld that is second nearest to the winding termination end of the positive electrode foil after the first weld, the negative electrode active material uncovered part includes a third weld that is nearest to a winding termination end of the negative electrode foil, and a fourth weld that is second nearest to the winding termination end of the negative electrode foil after the third weld, and the secondary battery satisfies Expressions (1) and (2) below:

$$0 \leq LC1 \leq LC2 \tag{1}$$

$$0 \leq LA1 \leq LA2 \tag{2}$$

where LC1 represents a distance from the winding termination end of the positive electrode foil to the first weld in millimeters, LC2 represents a distance from the first weld to the second weld in millimeters, LA1 represents a distance from the winding termination end of the negative electrode foil to the third weld in millimeters, and LA2 represents a distance from the third weld to the fourth weld in millimeters.

2. The secondary battery according to claim 1, wherein an upper limit of each of the LC1 and the LA1 is 0.38 D, and an upper limit of each of the LC2 and the LA2 is 0.75 D, where D represents a diameter of the lithium ion battery in millimeters.

3. The secondary battery according to claim 1, wherein the positive electrode active material uncovered part is bent to form a positive electrode side flat surface, and the positive electrode side flat surface and the positive electrode current collector plate are welded to each other, and the negative electrode active material uncovered part is bent to form a negative electrode side flat surface, and the negative electrode side flat surface and the negative electrode current collector plate are welded to each other.

4. The secondary battery according to claim 3, wherein the positive electrode current collector plate includes a positive electrode side fan-shaped part and a positive electrode side band-shaped part, and the positive electrode side fan-shaped part and the positive electrode side flat surface are welded to each other, and the negative electrode current collector plate includes a negative electrode side fan-shaped part and a negative electrode side band-shaped part, and the negative electrode side fan-shaped part and the negative electrode side flat surface are welded to each other.

5. The secondary battery according to claim 3, wherein the positive electrode side flat surface and the negative electrode side flat surface each have a groove.

6. Electronic equipment comprising the secondary battery according to claim 1.

7. An electric tool comprising the secondary battery according to claim 1.

* * * * *